US012578471B2

(12) United States Patent
Saito

(10) Patent No.: US 12,578,471 B2
(45) Date of Patent: Mar. 17, 2026

(54) SENSOR FUSION SYSTEM, SYNCHRONIZATION CONTROL APPARATUS, AND SYNCHRONIZATION CONTROL METHOD

(71) Applicant: Sony Semiconductor Solutions Corporation, Kanagawa (JP)

(72) Inventor: Masatake Saito, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 1255 days.

(21) Appl. No.: 17/282,986

(22) PCT Filed: Sep. 27, 2019

(86) PCT No.: PCT/JP2019/038088
§ 371 (c)(1),
(2) Date: Apr. 5, 2021

(87) PCT Pub. No.: WO2020/075525
PCT Pub. Date: Apr. 16, 2020

(65) Prior Publication Data
US 2021/0341616 A1 Nov. 4, 2021

(30) Foreign Application Priority Data
Oct. 12, 2018 (JP) ................................ 2018-193152

(51) Int. Cl.
G01S 17/89 (2020.01)
G01S 7/481 (2006.01)
(Continued)

(52) U.S. Cl.
CPC ............ G01S 17/89 (2013.01); G01S 7/4814 (2013.01); G01S 7/4816 (2013.01);
(Continued)

(58) Field of Classification Search
CPC ........ G01S 17/89; G01S 17/06; G01S 7/4863; G01S 17/10; G01S 17/86; G01C 11/02;
(Continued)

(56) References Cited

U.S. PATENT DOCUMENTS

2007/0055446 A1 3/2007 Schiffmann et al.
2008/0164985 A1 7/2008 Iketani et al.
(Continued)

FOREIGN PATENT DOCUMENTS

EP 1760491 A2 3/2007
EP 1950689 A2 7/2008
(Continued)

OTHER PUBLICATIONS

International Search Report and English translation thereof mailed Dec. 17, 2019 in connection with International Application No. PCT/JP2019/038088.

*Primary Examiner* — Isam A Alsomiri
*Assistant Examiner* — Joseph C Fritchman
(74) *Attorney, Agent, or Firm* — Wolf, Greenfield & Sacks, P.C.

(57) ABSTRACT

A sensor fusion system is provided that includes a ranging apparatus, an image-capturing apparatus, and a synchronization controller, the ranging apparatus including a light source module, a light source controller, and a light receiver, the light source module including a light source section, the image-capturing apparatus including a pixel section, an AD converter, and an exposure controller, the synchronization controller controlling the light source controller and the exposure controller such that a timing at which the light source section emits light to a specified region is synchronized with a timing at which a group of pixels corresponding to the specified region is exposed. The present disclosure is applicable to, for example, a sensor fusion system in which LiDAR and an imager are used in synchronization with each other.

18 Claims, 29 Drawing Sheets

(51) Int. Cl.
  *G01S 17/06* (2006.01)
  *H04N 25/40* (2023.01)

(52) U.S. Cl.
  CPC ............ *G01S 7/4817* (2013.01); *G01S 17/06* (2013.01); *H04N 25/40* (2023.01)

(58) Field of Classification Search
  CPC .. G01C 15/002; G01C 21/3602; H04N 25/40; H04N 25/531; H04N 25/767
  See application file for complete search history.

(56) References Cited

U.S. PATENT DOCUMENTS

| | | | |
|---|---|---|---|
| 2017/0315238 A1* | 11/2017 | Nagai .................. | G01S 7/4915 |
| 2018/0284256 A1 | 10/2018 | Sutou et al. | |
| 2019/0041503 A1* | 2/2019 | Shand .................... | G01S 17/42 |
| 2019/0098233 A1* | 3/2019 | Gassend ............... | H04N 23/73 |
| 2019/0107623 A1* | 4/2019 | Campbell ............ | G01S 7/4865 |
| 2020/0072644 A1* | 3/2020 | Masa ................. | G01D 5/34776 |
| 2020/0386865 A1* | 12/2020 | Greiner ................. | G01B 11/25 |

FOREIGN PATENT DOCUMENTS

| | | |
|---|---|---|
| EP | 2389007 A2 | 11/2011 |
| EP | 3358369 A1 | 8/2018 |
| JP | H07-333339 A | 12/1995 |
| JP | 2005-114542 A | 4/2005 |
| JP | 2008-172441 A | 7/2008 |
| JP | 2011-227029 A | 11/2011 |
| JP | 2015-212941 A | 11/2015 |
| JP | 2016-211881 A | 12/2016 |
| WO | WO 2017/057056 A1 | 4/2017 |

* cited by examiner

Drive light ray in second direction

Diffuse light ray in first direction

163

162

161

| Register | | Register name | Vnum | Hnum | Vstep | Hstep | Voffset | Hoffset | Vsize | Hsize |
|---|---|---|---|---|---|---|---|---|---|---|
| | | Description | Number of points in vertical direction | Number of points in horizontal direction | Vertical interval | Horizontal interval | Vertical offset | Horizontal offset | Vertical size | Horizontal size |
| Target region | whole | | 1080 | 2700 | 1 | 1 | | | 1080 | 2700 |
| | lidar | | 64 | 1280 | 8 | 2 | 284 | 70 | 512 | 2560 |
| | imager | | 1080 | 1920 | 1 | 1 | 0 | 390 | 1080 | 1920 |

Figure 23:
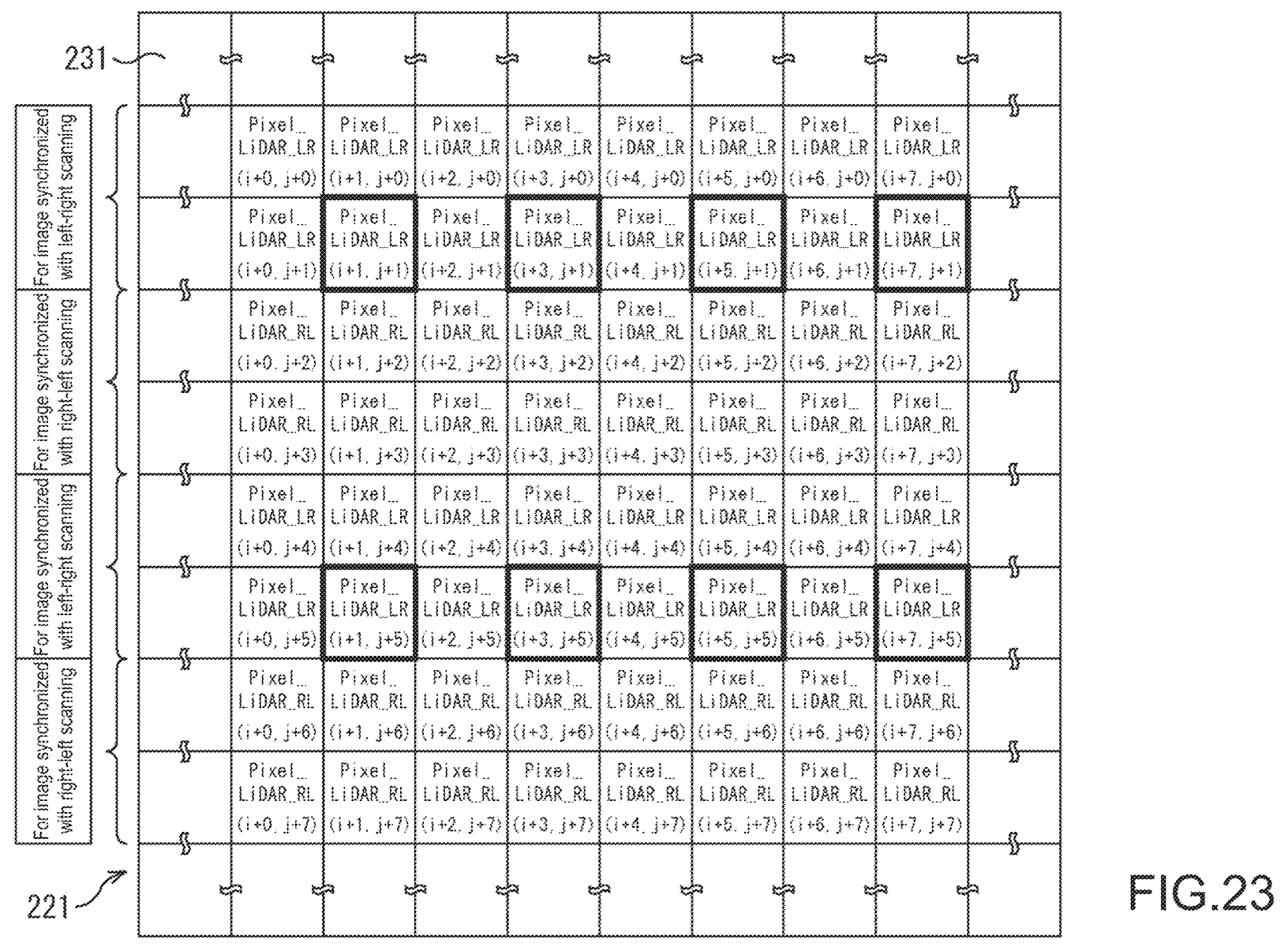

Pixel_LiDAR_LR (i+0, j+0)
Pixel_LiDAR_LR (i+1, j+0)
Pixel_LiDAR_LR (i+2, j+0)
Pixel_LiDAR_LR (i+3, j+0)
Pixel_LiDAR_LR (i+4, j+0)
Pixel_LiDAR_LR (i+5, j+0)
Pixel_LiDAR_LR (i+6, j+0)
Pixel_LiDAR_LR (i+7, j+0)

Pixel_LiDAR_RL (i+0, j+1)
Pixel_LiDAR_LR (i+1, j+1)
Pixel_LiDAR_LR (i+2, j+1)
Pixel_LiDAR_LR (i+3, j+1)
Pixel_LiDAR_LR (i+4, j+1)
Pixel_LiDAR_LR (i+5, j+1)
Pixel_LiDAR_LR (i+6, j+1)
Pixel_LiDAR_LR (i+7, j+1)

Pixel_LiDAR_RL (i+0, j+2)
Pixel_LiDAR_RL (i+1, j+2)
Pixel_LiDAR_RL (i+2, j+2)
Pixel_LiDAR_RL (i+3, j+2)
Pixel_LiDAR_RL (i+4, j+2)
Pixel_LiDAR_RL (i+5, j+2)
Pixel_LiDAR_RL (i+6, j+2)
Pixel_LiDAR_RL (i+7, j+2)

Pixel_LiDAR_RL (i+0, j+3)
Pixel_LiDAR_RL (i+1, j+3)
Pixel_LiDAR_RL (i+2, j+3)
Pixel_LiDAR_RL (i+3, j+3)
Pixel_LiDAR_RL (i+4, j+3)
Pixel_LiDAR_RL (i+5, j+3)
Pixel_LiDAR_RL (i+6, j+3)
Pixel_LiDAR_RL (i+7, j+3)

Pixel_LiDAR_LR (i+0, j+4)
Pixel_LiDAR_LR (i+1, j+4)
Pixel_LiDAR_LR (i+2, j+4)
Pixel_LiDAR_LR (i+3, j+4)
Pixel_LiDAR_LR (i+4, j+4)
Pixel_LiDAR_LR (i+5, j+4)
Pixel_LiDAR_LR (i+6, j+4)
Pixel_LiDAR_LR (i+7, j+4)

Pixel_LiDAR_LR (i+0, j+5)
Pixel_LiDAR_LR (i+1, j+5)
Pixel_LiDAR_LR (i+2, j+5)
Pixel_LiDAR_LR (i+3, j+5)
Pixel_LiDAR_LR (i+4, j+5)
Pixel_LiDAR_LR (i+5, j+5)
Pixel_LiDAR_LR (i+6, j+5)
Pixel_LiDAR_LR (i+7, j+5)

Pixel_LiDAR_RL (i+0, j+6)
Pixel_LiDAR_RL (i+1, j+6)
Pixel_LiDAR_RL (i+2, j+6)
Pixel_LiDAR_RL (i+3, j+6)
Pixel_LiDAR_RL (i+4, j+6)
Pixel_LiDAR_RL (i+5, j+6)
Pixel_LiDAR_RL (i+6, j+6)
Pixel_LiDAR_RL (i+7, j+6)

Pixel_LiDAR_RL (i+0, j+7)
Pixel_LiDAR_RL (i+1, j+7)
Pixel_LiDAR_RL (i+2, j+7)
Pixel_LiDAR_RL (i+3, j+7)
Pixel_LiDAR_RL (i+4, j+7)
Pixel_LiDAR_RL (i+5, j+7)
Pixel_LiDAR_RL (i+6, j+7)
Pixel_LiDAR_RL (i+7, j+7)

For image synchronized with left-right scanning
For image synchronized with right-left scanning
For image synchronized with left-right scanning
For image synchronized with right-left scanning

| Pixel auxiliarly corresponding to LiDAR | Pixel corresponding to LiDAR | Pixel for still image | Pixel for still image | Pixel auxiliarly corresponding to LiDAR | Pixel corresponding to LiDAR | Pixel for still image | Pixel for still image |
| Pixel auxiliarly corresponding to LiDAR | Pixel auxiliarly corresponding to LiDAR | Pixel for still image | Pixel for still image | Pixel auxiliarly corresponding to LiDAR | Pixel auxiliarly corresponding to LiDAR | Pixel for still image | Pixel for still image |
| Pixel auxiliarly corresponding to LiDAR | Pixel corresponding to LiDAR | Pixel for still image | Pixel for still image | Pixel auxiliarly corresponding to LiDAR | Pixel corresponding to LiDAR | Pixel for still image | Pixel for still image |
| Pixel auxiliarly corresponding to LiDAR | Pixel auxiliarly corresponding to LiDAR | Pixel for still image | Pixel for still image | Pixel auxiliarly corresponding to LiDAR | Pixel auxiliarly corresponding to LiDAR | Pixel for still image | Pixel for still image |
| Pixel auxiliarly corresponding to LiDAR | Pixel corresponding to LiDAR | Pixel for still image | Pixel for still image | Pixel auxiliarly corresponding to LiDAR | Pixel corresponding to LiDAR | Pixel for still image | Pixel for still image |
| Pixel auxiliarly corresponding to LiDAR | Pixel auxiliarly corresponding to LiDAR | Pixel for still image | Pixel for still image | Pixel auxiliarly corresponding to LiDAR | Pixel auxiliarly corresponding to LiDAR | Pixel for still image | Pixel for still image |
| Pixel auxiliarly corresponding to LiDAR | Pixel corresponding to LiDAR | Pixel for still image | Pixel for still image | Pixel auxiliarly corresponding to LiDAR | Pixel corresponding to LiDAR | Pixel for still image | Pixel for still image |
| Pixel auxiliarly corresponding to LiDAR | Pixel auxiliarly corresponding to LiDAR | Pixel for still image | Pixel for still image | Pixel auxiliarly corresponding to LiDAR | Pixel corresponding to LiDAR | Pixel for still image | Pixel for still image |

231

221

SENSOR FUSION SYSTEM, SYNCHRONIZATION CONTROL APPARATUS, AND SYNCHRONIZATION CONTROL METHOD

CROSS REFERENCE TO RELATED APPLICATIONS

This Application is a national stage filing under 35 U.S.C. 371 of International Patent Application Serial No. PCT/JP2019/038088, filed Sep. 27, 2019, Foreign priority benefits are claimed under 35 U.S.C. § 119(a)-(d) or 35 U.S.C. § 365(b) of Japanese application number 2018-193152, filed Oct. 12, 2018. The entire contents of these applications are incorporated herein by reference in their entirety.

TECHNICAL FIELD

The present disclosure relates to a sensor fusion system, a synchronization control apparatus, and a synchronization control method, and in particular, to a sensor fusion system, a synchronization control apparatus, and a synchronization control method, in which a ranging apparatus and an image-capturing apparatus are synchronized to improve a performance in fusion recognition.

BACKGROUND ART

In recent years, various types of sensors have been widely used, and a technology obtained by combining a plurality of types of sensors has been developed (for example, refer to Patent Literature 1).

CITATION LIST

Patent Literature

Patent Literature 1: Japanese Patent Application Laid-open No. 2015-212941

DISCLOSURE OF INVENTION

Technical Problem

Here, a combination of a ranging apparatus and an image-capturing apparatus is an example of the combination of a plurality of types of sensors. However, an approach for a technology that synchronizes a ranging apparatus and an image-capturing apparatus to improve a performance in fusion recognition has not been established, and there is a need for the technology that synchronizes a ranging apparatus and an image-capturing apparatus.

The present disclosure has been made in view of the circumstances described above, and is intended to synchronize a ranging apparatus and an image-capturing apparatus to improve a performance in fusion recognition.

Solution to Problem

A sensor fusion system of an aspect of the present disclosure is a sensor fusion system that includes a ranging apparatus that includes a light source module that includes a light source section and a drive section, the light source section emitting light extending in a first direction, the drive section driving an emission orientation of the light such that the light is emitted in a second direction that is orthogonal to the first direction, a light source controller that controls a timing at which the light source section emits the light, a light receiver that has a specified light-receiving range, and receives the light that is emitted by the light source section to be reflected off an object, a period-of-time measurement section that measures a period of time from the light source section emitting the light to the light receiver receiving the light reflected off the object, and a distance calculator that calculates a distance to the object from the light receiver or the light source module on the basis of the measured period of time; an image-capturing apparatus that includes a pixel section that includes a plurality of two-dimensionally arranged pixels, and has an image-capturing range that includes at least a portion of an emission range to which the light is emitted by the light source section, an AD converter that is arranged in the first direction, and performs AD conversion on signals output from a group of pixels from among the plurality of pixels, the group of pixels being a group of pixels arranged in the pixel section in the first direction, and an exposure controller that controls exposure of the plurality of pixels such that the plurality of pixels is scanned in the second direction; and a synchronization controller that controls the light source controller and the exposure controller such that a timing at which the light source section emits the light to a specified region is synchronized with a timing at which the group of pixels corresponding to the specified region is exposed.

In a sensor fusion system of an aspect of the present disclosure, a timing at which a light source section that emits light extending in a first direction and is included in a light source module emits the light, is controlled by a ranging apparatus, the light source module including the light source section and a drive section, the drive section driving an emission orientation of the light such that the light is emitted in a second direction that is orthogonal to the first direction; the ranging apparatus has a specified light-receiving range, and the light that is emitted by the light source section to be reflected off an object is received by the ranging apparatus; a period of time from the light source section emitting the light to a light receiver receiving the light reflected off the object is measured by the ranging apparatus; and a distance to the object from the light receiver or the light source module is calculated by the ranging apparatus on the basis of the measured period of time. Further, AD conversion is performed by an image-capturing apparatus on signals output from a group of pixels from among a plurality of two-dimensionally arranged pixels arranged in the first direction and included in a pixel section, the group of pixels being a group of pixels arranged in the pixel section in the first direction, the pixel section having an image-capturing range that includes at least a portion of an emission range to which the light is emitted by the light source section; and exposure of the plurality of pixels is controlled by the image-capturing apparatus such that the plurality of pixels is scanned in the second direction. Furthermore, the light source controller and the exposure controller are controlled by a synchronization controller such that a timing at which the light source section emits the light to a specified region is synchronized with a timing at which the group of pixels corresponding to the specified region is exposed.

A synchronization control apparatus of an aspect of the present disclosure is a synchronization control apparatus that controls synchronization of a ranging apparatus and an image-capturing apparatus, the ranging apparatus including a light source module that includes a light source section and a drive section, the light source section emitting light extending in a first direction, the drive section driving an emission orientation of the light such that the light is emitted in a second direction that is orthogonal to the first direction; a light source controller that controls a timing at which the light source section emits the light; a light receiver that has a specified light-receiving range, and receives the light that is emitted by the light source section to be reflected off an object; a period-of-time measurement section that measures a period of time from the light source section emitting the light to the light receiver receiving the light reflected off the object; and a distance calculator that calculates a distance to the object from the light receiver or the light source module on the basis of the measured period of time, the image-capturing apparatus including a pixel section that includes a plurality of two-dimensionally arranged pixels, and has an image-capturing range that includes at least a portion of an emission range to which the light is emitted by the light source section; an AD converter that is arranged in the first direction, and performs AD conversion on signals output from a group of pixels from among the plurality of pixels, the group of pixels being a group of pixels arranged in the pixel section in the first direction; and an exposure controller that controls exposure of the plurality of pixels such that the plurality of pixels is scanned in the second direction, the synchronization control apparatus including a synchronization controller that controls the light source controller and the exposure controller such that a timing at which the light source section emits the light to a specified region is synchronized with a timing at which the group of pixels corresponding to the specified region is exposed.

A synchronization control method of an aspect of the present disclosure is a synchronization control method that corresponds to the synchronization control apparatus of the above-described aspect of the present disclosure.

In a synchronization control apparatus and a synchronization control method of an aspect of the present disclosure, a light source controller and an exposure controller are controlled such that a timing at which a light source section emits light to a specified region is synchronized with a timing at which a group of pixels corresponding to the specified region is exposed.

Note that the ranging apparatus, the image-capturing apparatus, and the synchronization control apparatus may be independent apparatuses or internal blocks included in a single apparatus.

BRIEF DESCRIPTION OF DRAWINGS

FIG. 12 illustrates a specific example of the setting register.

FIG. 22 illustrates an example of a position of an excessive pixel included in the plurality of pixels arranged in the pixel section of the image sensor.

FIG. 23 illustrates an example of simultaneously capturing images corresponding to different scanning directions in parallel using a scheme using space division.

FIG. 26 illustrates a first example of using an excessive pixel.

FIG. 27 illustrates a second example of using an excessive pixel.

MODE(S) FOR CARRYING OUT THE INVENTION

Embodiments of a technology according to the present disclosure (the present technology) will now be described below with reference to the drawings. Note that the description will be made in the following order.

1. Embodiments of Present Technology
2. Modifications
3. Example of Application to Mobile Object

1. Embodiments of Present Technology (Configuration of Sensor Fusion System)

Figure 1:
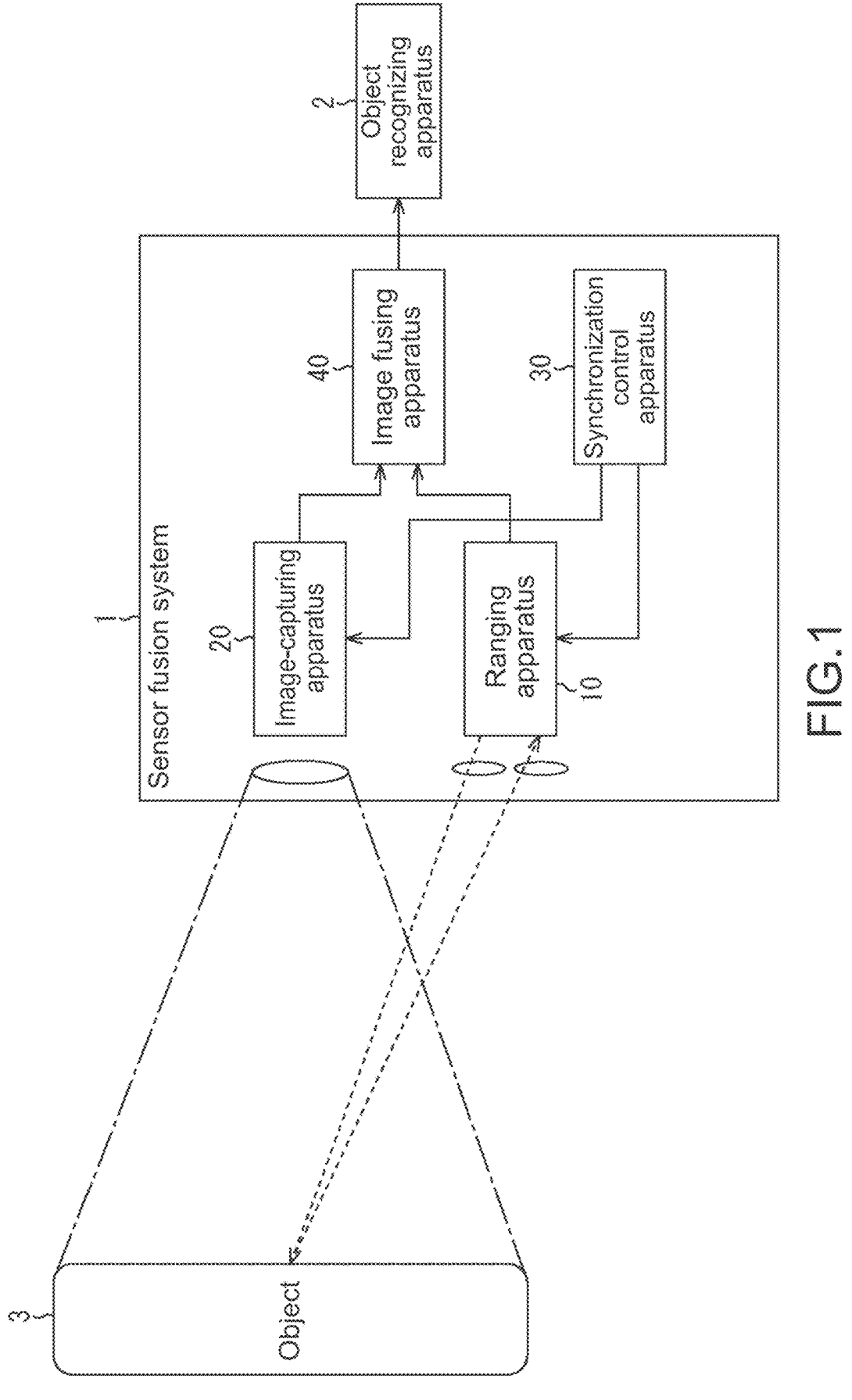
FIG. 1 illustrates an example of a configuration of a sensor fusion system to which a technology according to the present disclosure is applied.

FIG. 1 illustrates an example of a configuration of a sensor fusion system to which a technology according to the present disclosure is applied.

A sensor fusion system 1 is a system that includes a ranging apparatus 10 and an image-capturing apparatus 20 that are synchronized with each other to fuse a distance image (distance information) and a captured image (a two-dimensional image, and hereinafter referred to as a 2D image), and is capable of performing an object recognition using the fused images.

In FIG. 1, the sensor fusion system 1 includes the ranging apparatus 10, the image-capturing apparatus 20, a synchronization control apparatus 30, and an image fusing apparatus 40. Further, the sensor fusion system 1 is connected to an object recognizing apparatus 2 through a specified interface.

The ranging apparatus 10 is an apparatus that irradiates light onto an object 3 to measure a distance. For example, the ranging apparatus 10 is, for example, light detection and ranging (LiDAR).

According to a synchronization signal and setting information from the synchronization control apparatus 30, the ranging apparatus 10 irradiates, onto the object 3, light emitted from a light source section, receives the light reflected off the object 3 using a light receiver, and measures a period of time from the light being emitted to the reflected light being received. On the basis of the measured period of time, the ranging apparatus 10 calculates a distance to the object 3 from the light source section or the light receiver. The ranging apparatus 10 outputs data of information regarding the calculated distance (a distance image) to the image fusing apparatus 40.

The image-capturing apparatus 20 is an apparatus that captures an image of the object 3. For example, the image-capturing apparatus 20 is, for example, an imager that includes an image sensor. Here, the image sensor is, for example, a complementary metal-oxide semiconductor (CMOS) image sensor, a charge coupled device (CCD) image sensor, or an image sensor using an organic photo-electric conversion film that includes a pixel section (a pixel array) and an AD converter, the pixel section including two-dimensionally arranged pixels that each include a photoelectric conversion element.

According to a synchronization signal and setting information from the synchronization control apparatus 30, the image-capturing apparatus 20 captures light entering from the object 3 (image light) through an optical lens system, and converts, per pixel and into an electric signal, an amount of the entering light of which the image is formed on an imaging surface of the image sensor to generate a 2D image. The image-capturing apparatus 20 outputs data of the 2D image to the image fusing apparatus 40.

The synchronization control apparatus 30 is an apparatus that controls synchronization of an operation of the ranging apparatus 10 and an operation of the image-capturing apparatus 20. For example, the synchronization control apparatus 30 includes a central processing unit (CPU), a microcomputer, and a field programmable gate array (FPGA).

The synchronization control apparatus 30 generates a synchronization signal and setting information that are used to synchronize a timing at which a light source of the ranging apparatus 10 emits light to a specified region of the object 3, and a timing at which a group of pixels that corresponds to the specified region is exposed in the image-capturing apparatus 20, and outputs the generated synchronization signal and setting information to the ranging apparatus 10 and to the image-capturing apparatus 20.

The image fusing apparatus 40 fuses a distance image output by the ranging apparatus 10 and a 2D image output by the image-capturing apparatus 20, and outputs resulting fusion information (fusion image) to the object recognizing apparatus 2. For example, the image fusing apparatus 40 includes a CPU, a graphics processing unit (GPU), a microcomputer, an FPGA, and various memories.

Note that, in the object recognizing apparatus 2, object recognition processing is performed to recognize the object 3, on the basis of the fusion information output by (the image fusing apparatus 40 of) the sensor fusion system 1. For example, when the sensor fusion system 1 is included in a vehicle, a pedestrian, another vehicle, an obstacle, and the like are recognized as the object 3 situated around the vehicle.

In the sensor fusion system 1 having the configuration described above, a distance image obtained by the ranging apparatus 10 and a 2D image obtained by the image-capturing apparatus 20 are fused to perform object recognition processing. For example, the following are reasons for that.

That is, information regarding a distance to the object 3 (a distance image) can be obtained by the ranging apparatus 10 alone, such as LiDAR, but it is not possible to obtain information regarding the shape of the object 3. Further, the distance image obtained by the ranging apparatus 10 has a lower resolution than a 2D image obtained by the image-capturing apparatus 20. It is hard to say that a sufficient recognition performance is provided by performing object recognition processing using a distance image.

On the other hand, a 2D image of the object 3 is obtained by the image-capturing apparatus 20 alone, such as an imager, and this makes it possible to recognize the shape of the object 3 in a two-dimensional plane. However, it is not possible to obtain information regarding the depth. Thus, there is a possibility that object recognition processing using the 2D image will result in falsely recognizing, for example, a photographic signboard.

Thus, in the sensor fusion system 1, a distance image obtained by the ranging apparatus 10 and a 2D image obtained by the image-capturing apparatus 20 are fused to perform three-dimensional object recognition processing. This results in improving a performance in the recognition (fusion recognition performance).

In this case, it will not be possible to sufficiently improve a three-dimensional recognition performance due to time lag or positional shift unless fusing is performed in a state in which a distance image and a 2D image are in synchronization with each other. Thus, the sensor fusion system 1 improves a three-dimensional recognition performance due to the ranging apparatus 10 and image-capturing apparatus 20 being in synchronization with each other.

(Scanning Scheme Performed by Ranging Apparatus)

Here, a beam scanning scheme that is a scheme of performing scanning in a ranging-target space using a beam of light, is an example of a scanning scheme performed by the ranging apparatus 10.

A two-dimensional scanning scheme and a one-dimensional scanning scheme are examples of the beam scanning scheme. In the two-dimensional scanning scheme, scanning is performed in a two-dimensional direction using a single laser beam. In the one-dimensional scanning scheme, a plurality of laser beams is linearly arranged (arranged in a one-dimensional direction) or a single laser beam (a single light source) is linearly diffused to be one-dimensionally irradiated, and scanning is performed in an orthogonal one-dimensional direction.

Each scanning axis has attributes related to speed and direction. In the two-dimensional scanning scheme, there are two orthogonal scanning axes that are a high-speed scanning axis and a low-speed scanning axis, and the scanning pattern for each of the scanning axes is one-way-direction scanning or back-and-forth scanning. On the other hand, in the one-dimensional scanning scheme, there is only a low-speed scanning axis, and the scanning pattern is one-way-direction scanning or back-and-forth scanning.

However, the high-speed scanning axis is a directional axis used to perform scanning with a laser beam at high speed, and the low-speed scanning axis is a directional axis used to perform scanning with a laser beam at low speed. With respect to each of the scanning axes, there are a case in which the axis is in the horizontal direction, and a case in which the axis is in the vertical direction.

Further, the one-way-direction scanning is a scheme of performing scanning in one direction in a fixed manner along a target scanning axis. On the other hand, the back-and-forth scanning is a scheme of performing scanning back and forth alternately (in a certain direction and a direction opposite to the certain direction) along a target scanning axis.

Here, specific examples of the scanning scheme performed by the ranging apparatus 10 are described with reference to FIGS. 2 to 4.

Figure 2:
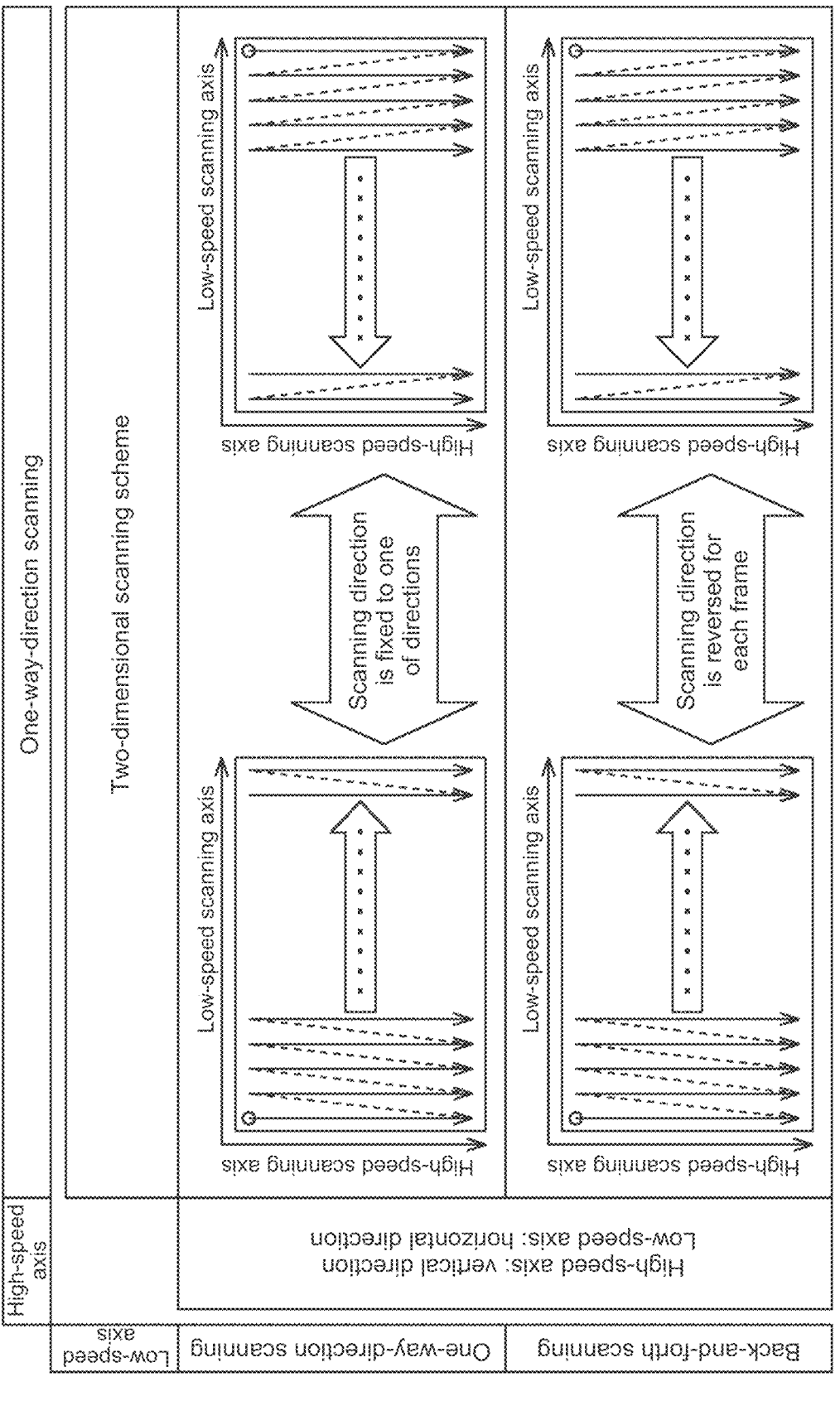
FIG. 2 illustrates a first example of a light-source control performed in a two-dimensional scanning scheme performed by a ranging apparatus.
Figure 3:
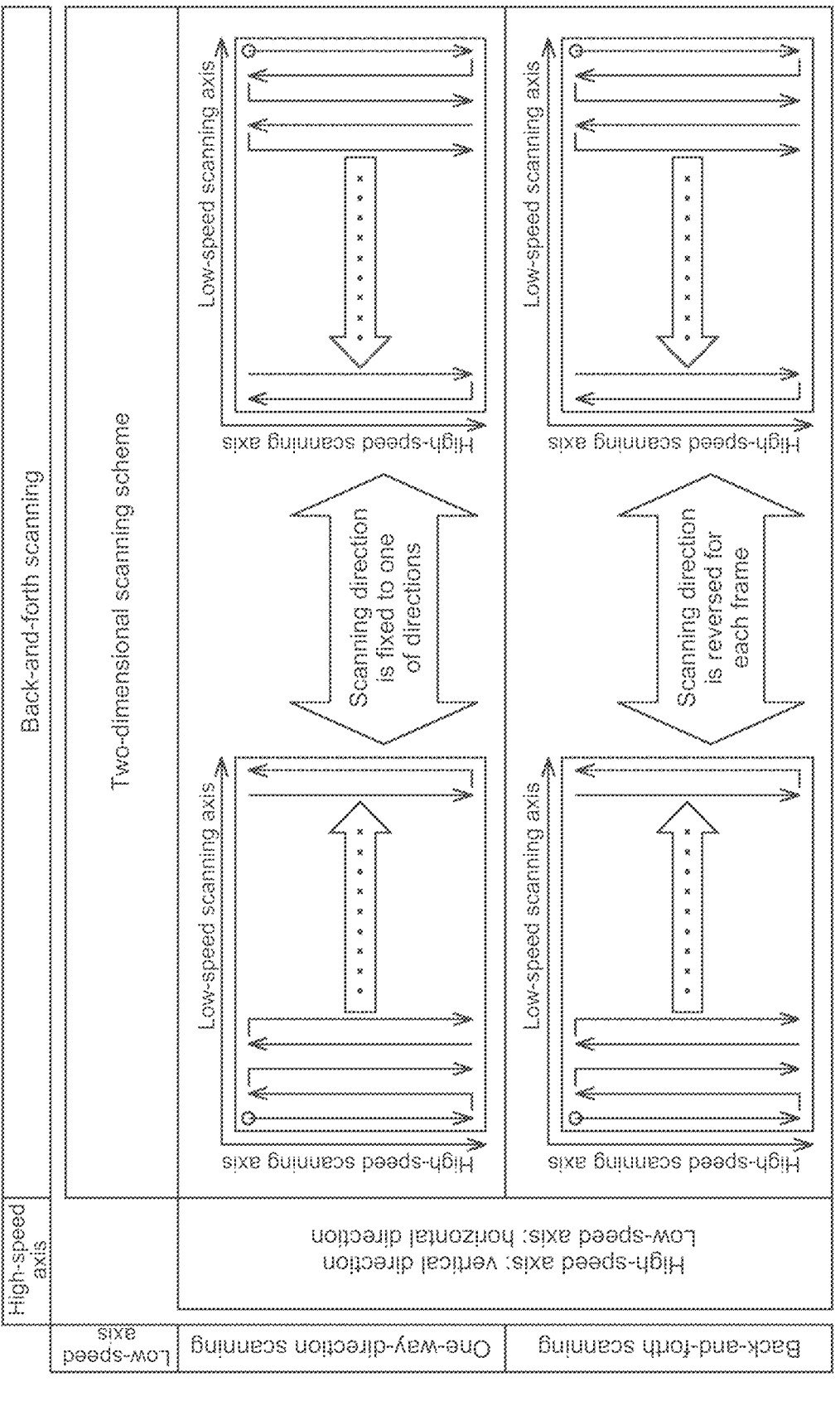
FIG. 3 illustrates a second example of the light-source control performed in the two-dimensional scanning scheme performed by the ranging apparatus.

FIGS. 2 and 3 illustrate examples of the two-dimensional scanning scheme of the beam scanning scheme. FIG. 2 illustrates an example in which the scanning pattern for a high-speed scanning axis in the two-dimensional scanning scheme is one-way-direction scanning, where the scanning direction of the vertical high-speed-scanning axis is fixed to a direction from top to bottom. Here, with respect to a horizontal low-speed-scanning axis, FIG. 2 illustrates a case in which the scanning direction is fixed to a direction from left to right or from right to left, and a case in which the scanning direction is reversed for each frame. Further, FIG. 3 illustrates an example in which the scanning pattern for a high-speed scanning axis in the two-dimensional scanning scheme is back-and-forth scanning, where the scanning direction of the vertical high-speed-scanning axis is alternately reversed between a direction from top to bottom and a direction from bottom to top. Here, with respect to a horizontal low-speed-scanning axis, FIG. 3 illustrates a case in which the scanning direction is fixed to a direction from left to right or from right to left, and a case in which the scanning direction is reversed for each frame.

Figure 4:
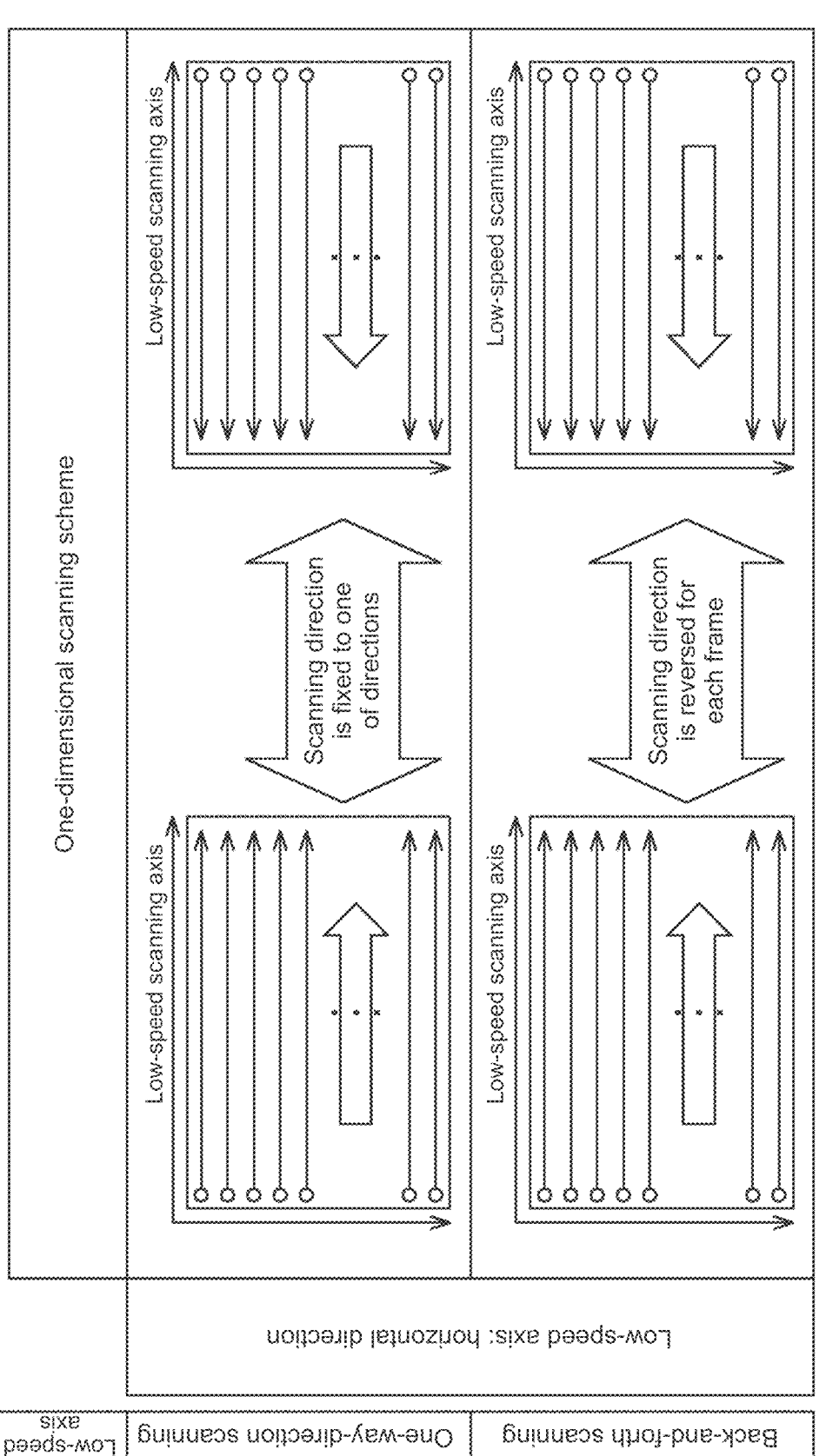
FIG. 4 illustrates an example of a light-source control performed in a one-dimensional scanning scheme performed by the ranging apparatus.

FIG. 4 illustrates an example of the one-dimensional scanning scheme of the beam scanning scheme. FIG. 4 illustrates an example in which the scanning pattern for a low-speed scanning axis in the one-dimensional scanning scheme is one-way-direction scanning, where the scanning direction of a horizontal low-speed-scanning axis is fixed to a direction from left to right or from right to left. FIG. 4 further illustrates an example in which the scanning pattern for a low-speed scanning axis in the one-dimensional scanning scheme is back-and-forth scanning, where the scanning direction of a horizontal low-speed-scanning axis is reversed for each frame.

Figure 5:
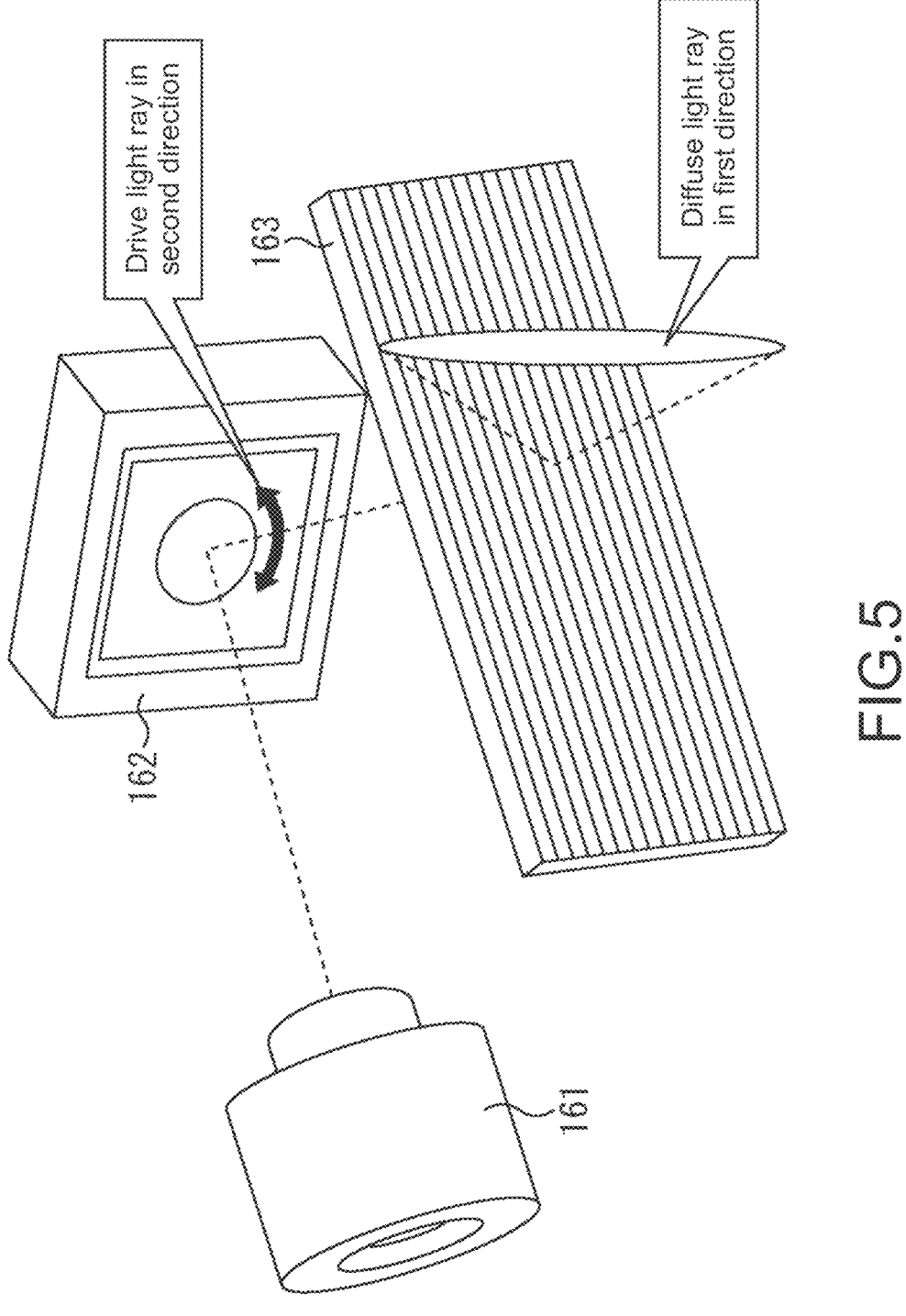
FIG. 5 illustrates an example of a mechanism adopted when a light-source irradiation is performed by performing back-and-forth scanning in the one-dimensional scanning scheme.
Figure 6:
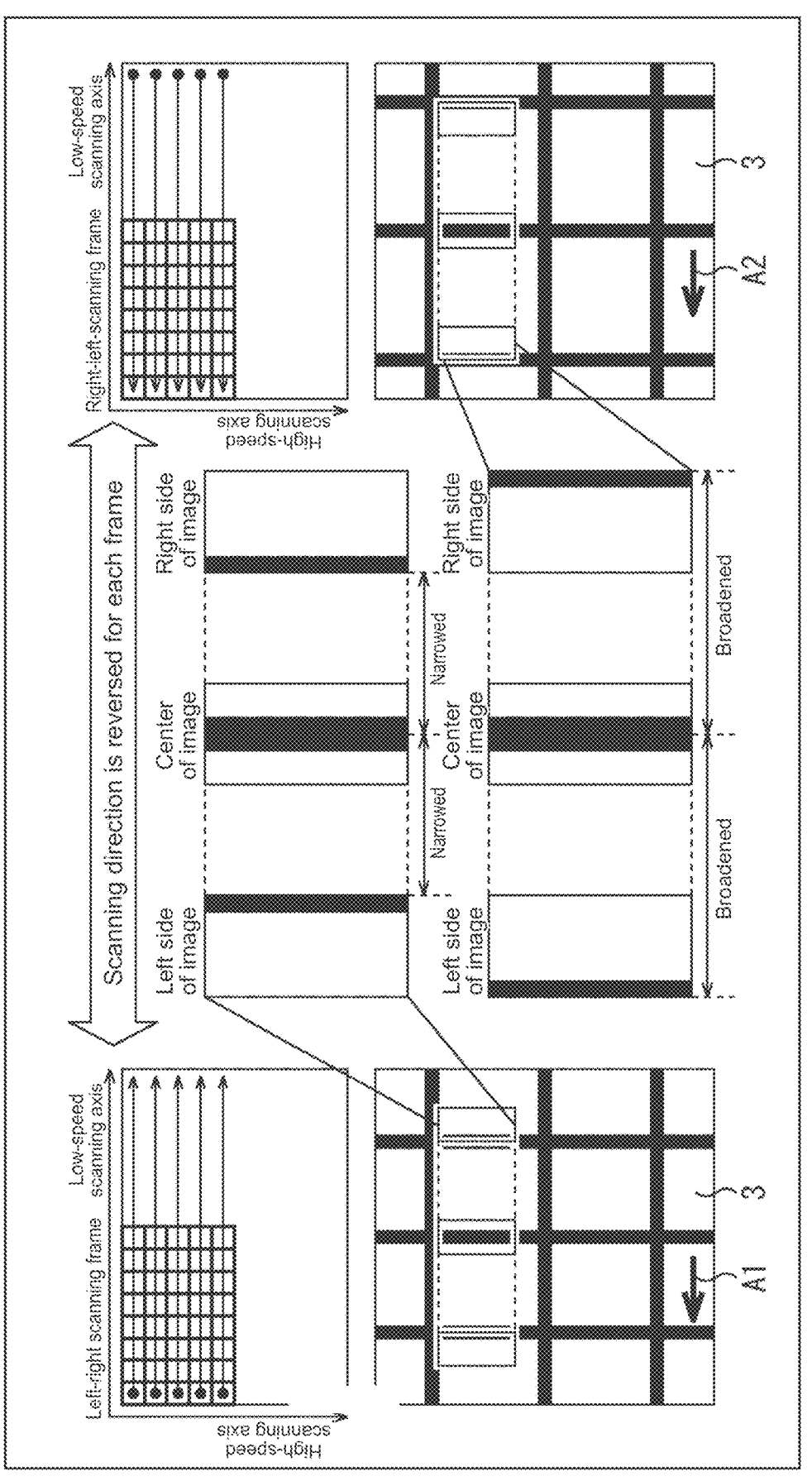
FIG. 6 illustrates an example of how a moving object expands and contracts when a light-source irradiation is performed by performing back-and-forth scanning in the one-dimensional scanning scheme.

Here, with reference to FIGS. 5 and 6, a configuration using a light source module illustrated in FIG. 5 is described as an example of a configuration adopted when a light-source irradiation is performed by performing back-and-forth scanning with a horizontal low-speed-scanning axis in the one-dimensional scanning scheme of the beam scanning scheme. The light source module of FIG. 5 includes a light source section 161, a single-axis galvanometer mirror 162, and a diffusion lens 163.

In FIG. 5, laser light emitted by the light source section 161 is reflected off the single-axis galvanometer mirror 162 to perform horizontal scanning with the laser light, and the later light enters the diffusion lens 163. In the diffusion lens 163, the laser light with which horizontal scanning has been performed is vertically diffused by the single-axis galvanometer mirror 162 to perform back-and-forth swinging scanning using the single-axis galvanometer mirror 162.

As described above, the use of a light source module that includes the single-axis galvanometer mirror 162 and the like enables the ranging apparatus 10 to perform scanning in each frame back and forth alternately, such as in a first direction and a second direction (opposite to the first direction), the first direction being a direction from left to right, the second direction being a direction from right to left. Here, FIG. 6 illustrates how a moving object (the moving object 3) in a distance image expands and contracts when the scanning direction is reversed for each frame using a light source module that includes the single-axis galvanometer mirror 162 and the like.

In FIG. 6, in a frame on which scanning from left to right (hereinafter also referred to as left-right scanning) is performed, spacing between a vertical line on the left side of an image and a vertical line on the right side of the image is narrowed when the object 3 including a square grid pattern in the figure moves in a direction indicated by an arrow A1, the vertical lines on the left side of the image and the right side of the image being situated across a vertical line at the center of the image from each other. In other words, in this case, a direction of the left-right scanning and the direction indicated by the arrow A1 are opposite to each other, and it can be said that the object 3 moving in a direction opposite to a scanning direction contracts.

On the other hand, in a frame on which scanning from right to left (hereinafter also referred to as right-left scanning) is performed, spacing between a vertical line on the left side of an image and a vertical line on the right side of the image is broadened when the object 3 including a square grid pattern in the figure moves in a direction indicated by an arrow A2, the left side of the image and the right side of the image being situated across a vertical line at the center of the image from each other. In other words, in this case, a direction of the right-left scanning and the direction indicated by the arrow A2 are the same, and it can be said that the object 3 moving in the same direction as a scanning direction expands.

The configuration of the light source module that includes the single-axis galvanometer mirror 162 and the like has been described above as an example of the configuration adopted when a light-source irradiation is performed by performing back-and-forth scanning in the one-dimensional scanning scheme of the beam scanning scheme. However, for example, a light source module that includes a single-axis polygon mirror can be used when a light-source irradiation is performed by performing one-way-direction scanning in the one-dimensional scanning scheme.

Further, in the two-dimensional scanning scheme of the beam scanning scheme, a light source module that includes a two-axis galvanometer mirror can be used when a light-source irradiation is performed by performing back-and-forth scanning, and a light source module that includes a two-axis polygon mirror can be used when a light-source irradiation is performed by performing one-way-direction scanning.

As described above, there exist various schemes that are examples of the scanning scheme performed by the ranging apparatus 10. However, an example in which horizontal back-and-forth scanning is adopted as the one-dimensional scanning scheme of the beam scanning scheme, is described. In the following description, in particular, the ranging apparatus 10 adopting this scanning scheme is also referred to as the ranging apparatus 10 of horizontal back-and-forth scanning. Note that the approach of the technology according to the present disclosure is applicable not only to the ranging apparatus 10 of horizontal back-and-forth scanning, but also to the ranging apparatus 10 of another light-source irradiation scheme. Further, in the present disclosure, "frame" is consistently used for both "frame" and "field" without distinguishing them from each other. However, "field" may be used instead of "frame". In particular, when back-and-forth scanning is performed as a scanning scheme performed by the ranging apparatus 10, "field" is often used instead of "frame".

(Configuration of Image Sensor of Image-Capturing Apparatus)

Figure 7:
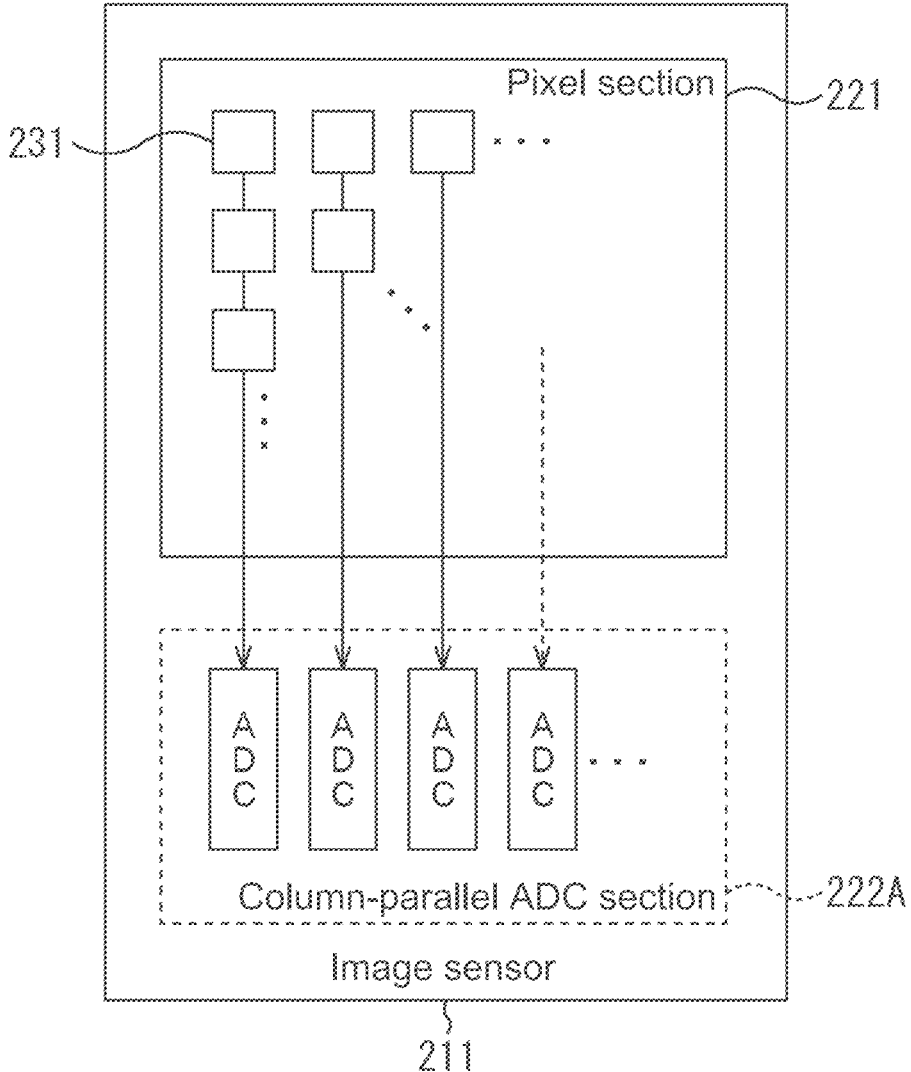
FIG. 7 illustrates a first example of a configuration of an image sensor included in an image-capturing apparatus.
Figure 8:
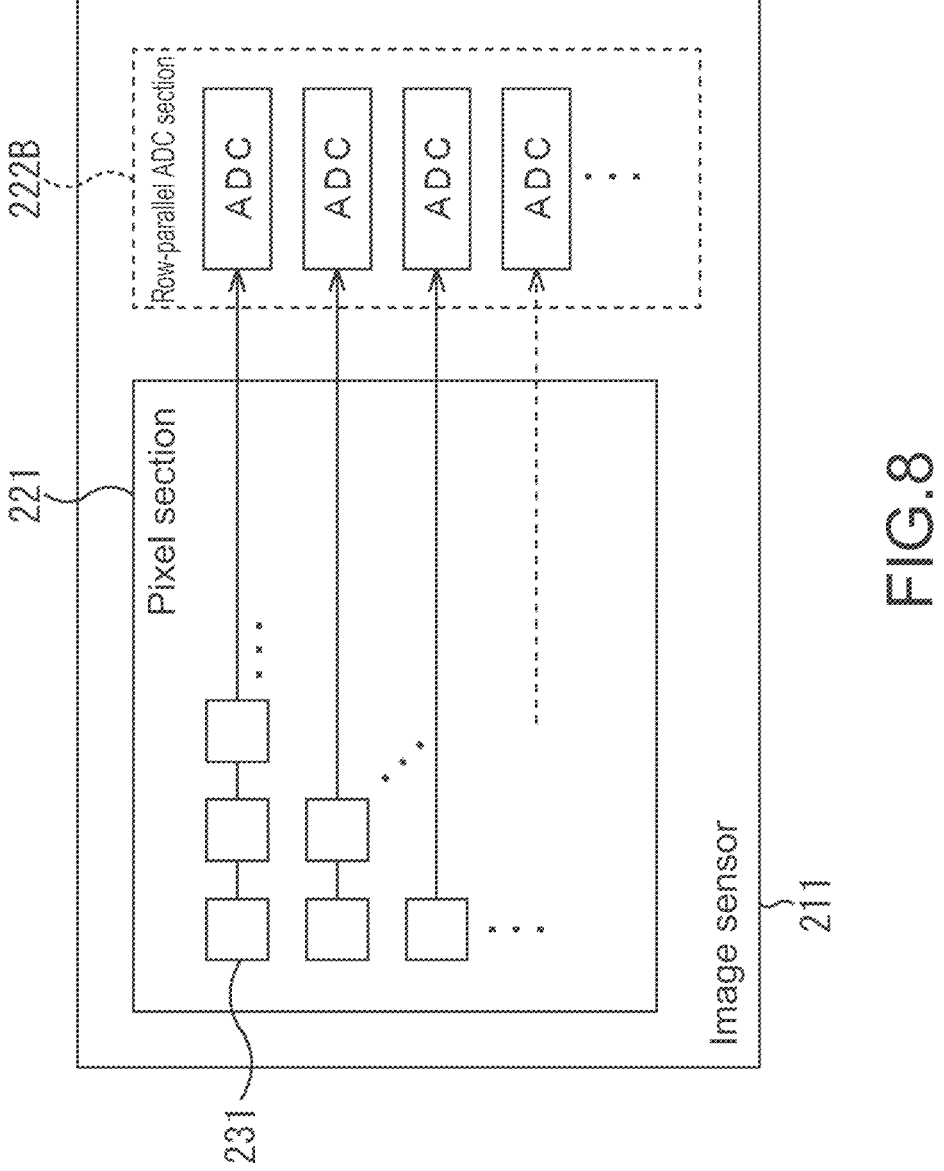
FIG. 8 illustrates a second example of the configuration of the image sensor included in the image-capturing apparatus.
Figure 9:
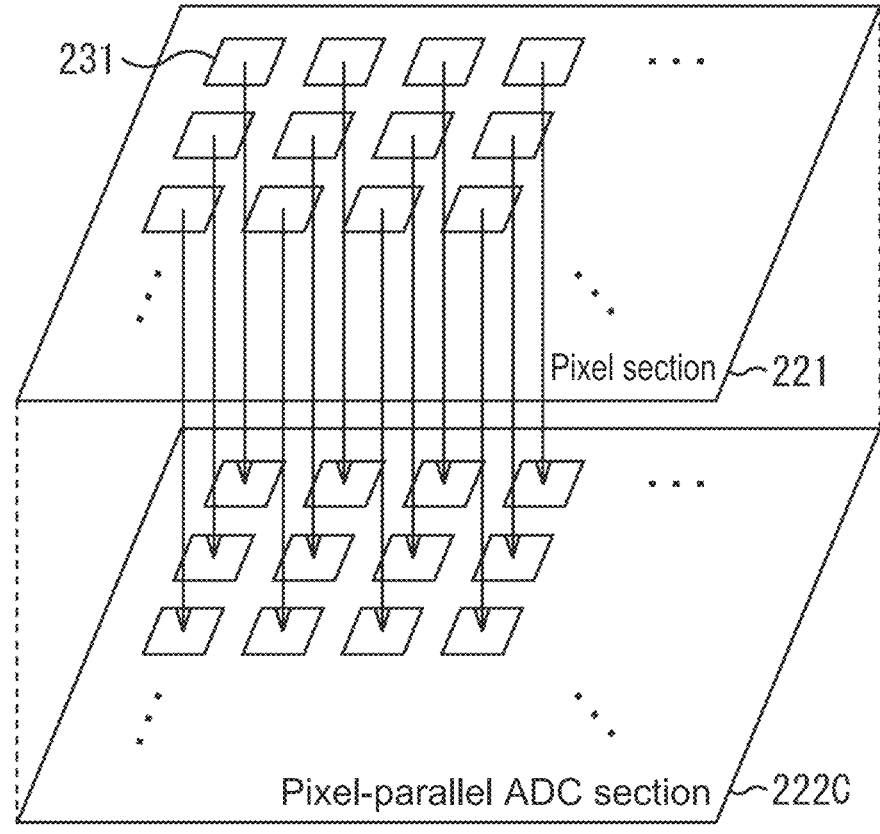
FIG. 9 illustrates a third example of the configuration of the image sensor included in the image-capturing apparatus.

Here, for example, a configuration of an analog-to-digital converter (ADC) section 222 illustrated in FIGS. 7 to 9 is adopted for an image sensor 211 included in the image-capturing apparatus 20, in order to synchronize an exposure timing of the image sensor 211 with the ranging apparatus 10.

FIG. 7 illustrates an example of a configuration of the image sensor 211 including the ADC section 222 adopting a column-parallel ADC scheme.

In the image sensor 211 illustrated in FIG. 7, signal values obtained by photoelectric conversion performed by a plurality of pixels 231 two-dimensionally arranged in a pixel section 221 are individually input to a column-parallel ADC section 222A through respective vertical signal lines, and parallel processing is performed on an ADC in a direction of a column of the pixel section 221. Note that, when the column-parallel ADC scheme is adopted, processing is performed by time division in a direction of a row of the pixel section 221.

Here, in the column-parallel ADC scheme, the exposure timing can only be controlled for each row since an ADC is shared by time division in the direction of the row of the pixel section 221. Thus, it is possible to adopt the column-parallel ADC scheme for the image sensor 211 of the image-capturing apparatus 20 when a light-source irradiation scheme for the synchronization-target ranging apparatus 10 is a beam scanning scheme and the direction of a low-speed scanning axis is the vertical direction.

FIG. 8 illustrates an example of the configuration of the image sensor 211 including the ADC section 222 adopting a row-parallel ADC scheme.

In the image sensor 211 illustrated in FIG. 8, signal values obtained by photoelectric conversion performed by a plurality of pixels 231 two-dimensionally arranged in the pixel section 221 are individually input to a row-parallel ADC section 222B through respective horizontal signal lines, and parallel processing is performed on an ADC in the direction of the row of the pixel section 221. Note that, when the row-parallel ADC scheme is adopted, processing is performed by time division in the direction of the column of the pixel section 221.

Here, in the row-parallel ADC scheme, the exposure timing can only be controlled for each column since an ADC is shared by time division in the direction of the column of the pixel section 221. Thus, it is possible to adopt the row-parallel ADC scheme for the image sensor 211 of the image-capturing apparatus 20 when a light-source irradiation scheme for the synchronization-target ranging apparatus 10 is a beam scanning scheme and the direction of a low-speed scanning axis is the horizontal direction.

FIG. 9 illustrates an example of the configuration of the image sensor 211 including the ADC section 222 adopting a pixel-parallel ADC scheme.

In the image sensor 211 illustrated in FIG. 9, a pixel-parallel ADC section 222C is provided that includes two-dimensionally arranged ADCs that respectively correspond to the pixels 231 arranged in the pixel section 221. Consequently, signal values obtained by photoelectric conversion performed by the respective pixels 231 are individually input through respective signal lines to ADCs provided for the respective pixels 231, and parallel processing is performed on an ADC for each pixel included in the pixel section 221.

As described above, in the pixel-parallel ADC scheme, the exposure timing can only be controlled for each frame when a digital-to-analog converter (ADC) used for a reference voltage upon performing AD conversion is shared. Thus, it is possible to adopt the pixel-parallel ADC scheme for the image sensor 211 of the image-capturing apparatus 20 when a light-source irradiation scheme for the synchronization-target ranging apparatus 10 is a flash scheme.

Note that it is possible to share a DAC since AD conversion is performed on all of the pixels 231 at the same timing when exposure is performed by the image sensor 211 by a global shutter scheme. Further, the flash scheme is a scheme in which laser light is extensively diffusely irradiated onto a ranging-target space by the ranging apparatus 10.

As described above, a synchronization scheme that is applicable in the image-capturing apparatus 20 differs depending on a scheme of irradiation performed by a laser source of the ranging apparatus 10. However, in the present disclosure, an example in which horizontal back-and-forth scanning in the one-dimensional scanning scheme of the beam scanning scheme is adopted as a scanning scheme performed by the synchronization-target ranging apparatus 10, is described. Thus, an example in which a row-parallel ADC scheme is adopted as an ADC scheme for the image-capturing apparatus 20 and exposure is performed by a rolling shutter scheme, is described. In the following description, in particular, the image-capturing apparatus 20 adopting this scheme is also referred to as the image-capturing apparatus 20 of a row-parallel ADC scheme. Note that the approach of the technology according to the present disclosure is applicable not only to the image-capturing apparatus 20 of a row-parallel ADC scheme but also to the image-capturing apparatus 20 of another ADC scheme.

(Detailed Configuration of Sensor Fusion System)

Figure 10:
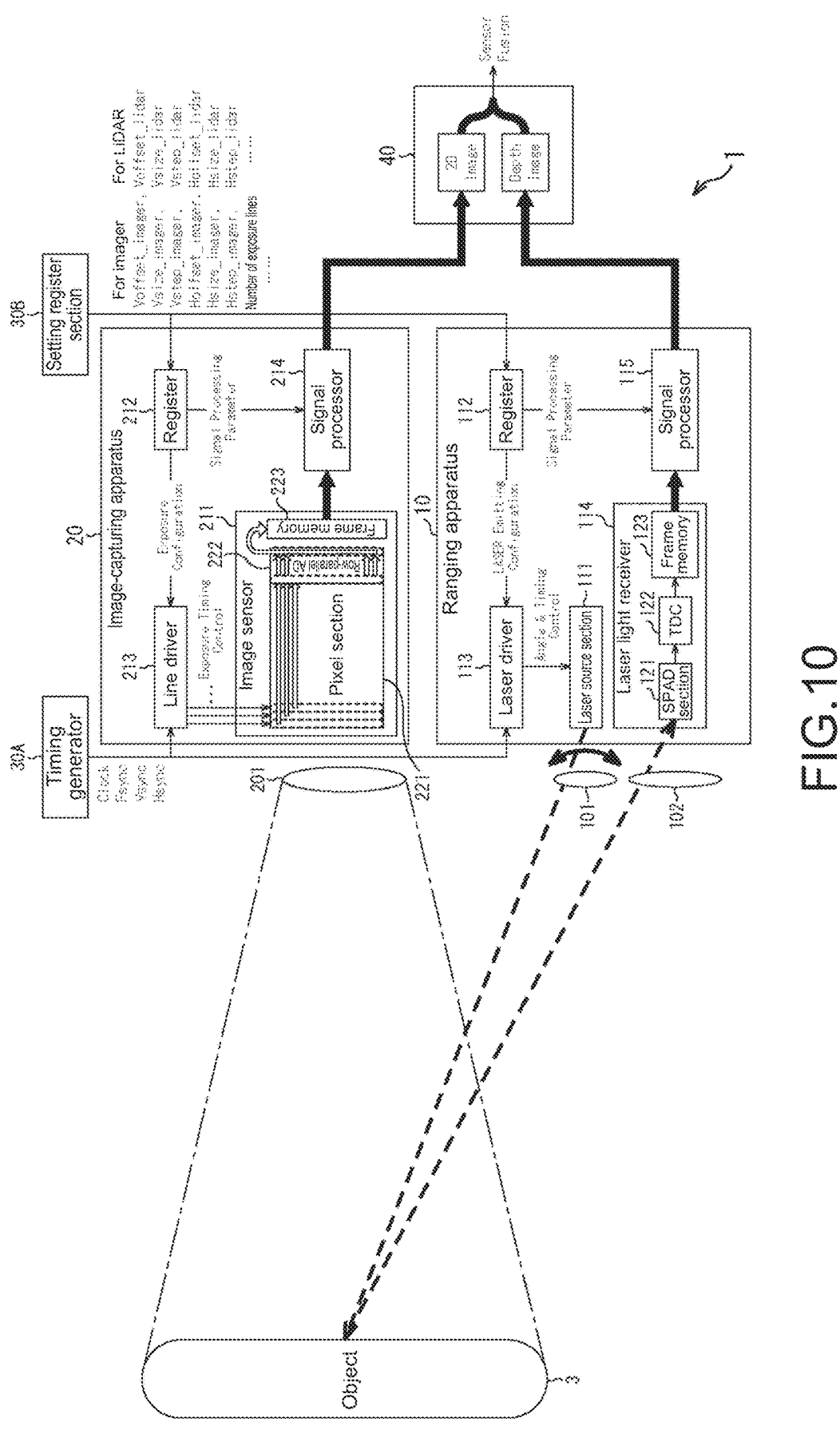
FIG. 10 illustrates an example of a detailed configuration of the sensor fusion system to which the technology according to the present disclosure is applied.

FIG. 10 illustrates an example of a detailed configuration of the sensor fusion system to which the technology according to the present disclosure is applied.

The sensor fusion system 1 of FIG. 10 includes the ranging apparatus 10 of horizontal back-and-forth scanning, the image-capturing apparatus 20 of a row-parallel ADC scheme, a timing generator 30A, a setting register section 30B, and the image fusing apparatus 40. Note that the timing generator 30A and the setting register section 30B are included in the synchronization control apparatus 30 (FIG. 1).

The timing generator 30A generates a shared clock and a shared synchronization signal that are used as a reference for the timing, and supplies the shared clock and synchronization signal to the ranging apparatus 10 and to the image-capturing apparatus 20. Examples of the synchronization signal include a frame synchronizing signal (Fsync), a vertical synchronization signal (Vsync), and a horizontal synchronization signal (Hsync).

The setting register section 30B holds various setting registers (setting information) and supplies the various setting registers to the ranging apparatus 10 and to the image-capturing apparatus 20. Examples of the setting register include a parameter related to a synchronization timing control (such as various parameters used to control laser irradiation and to control the exposure timing).

The ranging apparatus 10 generates (acquires) a distance image on which a timing control has been performed. The ranging apparatus 10 includes, for example, a laser source section 111, a register 112, a laser driver 113, a laser light receiver 114, and a signal processor 115.

Note that the laser source section 111 is, for example, a light source module that includes the single-axis galvanometer mirror 162 and the like illustrated in FIG. 5. Further, the laser light receiver 114 includes, for example, a single photon avalanche diode (SPAD) section 121, a time-to-digital converter (TDC) 122, and a frame memory 123.

For example, the register 112 holds various parameters such as a parameter used to control laser irradiation and a parameter used to perform signal processing on a distance image. More specifically, when, for example, the ranging apparatus 10 is LiDAR, a setting register (setting information) supplied by the setting register section 30B, such as a group of a series of setting registers (Voffset_lidar, Vsize_lidar, Vstep_lidar, Hoffset_lidar, Hsize_lidar, and Hstep_lidar) that is used to indicate an effective region for LiDAR from among an entire virtual region, is held in the register 112.

On the basis of a parameter that is used to control laser irradiation and acquired from the register 112, and a synchronization signal from the timing generator 30A, the laser driver 113 controls the direction and the timing of irradiation of laser light that is performed by the laser source section 111.

In accordance with control performed by the laser driver 113, the laser source section 111 emits laser light to irradiate the laser light onto the object 3 through a lens 101. Then, the laser light emitted by the laser source section 111 is reflected off the object 3, and the reflected light is received by the laser light receiver 114 through a lens 102.

In the laser light receiver 114, the reflected light from the object 3 is received to be converted into an electric pulse by an SPAD of the SPAD section 121, and its signal value is measured by the TDC 122. Here, reflected laser light from a long-range object is low, and it is difficult to obtain a stable ranging result in one measurement. Thus, there is an approach of making a ranging result stable by performing measurement multiple times for each point and performing signal processing. With respect to the measured signal value, a variation in data of measurement performed at each point in a group of points and a variation in timing between points in the group of points are accommodated by the frame memory 123, and the measured signal value is supplied by the frame memory 123 to the signal processor 115 for each frame.

On the basis of a parameter that is used to perform signal processing on a distance image and acquired from the register 112, the signal processor 115 performs distance-image signal processing with respect to the signal value input by the laser light receiver 114 for each frame. In the distance-image signal processing, a distance to the object 3 from the laser light receiver 114 or the laser source section 111 is calculated on the basis of, for example, a signal value (a period of time) measured by the TDC 122, and a distance image (distance information) is generated. The signal processor 115 outputs the generated distance image to the image fusing apparatus 40.

The image-capturing apparatus 20 generates (acquires) a 2D image on which a timing control has been performed. The image-capturing apparatus 20 includes, for example, the image sensor 211, a register 212, a line driver 213, and a signal processor 214. Further, the image sensor 211 includes, for example, the pixel section 221, the row-parallel A/D converter section 222, and a frame memory 223.

For example, the register 212 holds various parameters such as a parameter used to control the exposure timing and a parameter used to perform signal processing on a 2D image. More specifically, when, for example, the image-capturing apparatus 20 is an imager, a setting register (setting information) supplied by the setting register section 30B, such as the number of exposure lines, and a group of a series of setting registers (Voffset_imager, Vsize_imager, Vstep_imager, Hoffset_imager, Hsize_imager, and Hstep_imager) that is used to indicate an effective region for an imager from among an entire virtual region, is held in the register 212.

On the basis of a parameter that is used to control the exposure timing and acquired from the register 212, and a synchronization signal from the timing generator 30A, the line driver 213 generates a signal used to control the timing of exposing each line in the pixel section 221 of the image sensor 211, and supplies the generated signal to (each pixel 231 arranged in) the pixel section 221.

Note that, in the image-capturing apparatus 20 of a row-parallel ADC scheme, the row-parallel AD converter section 222 is provided to the image sensor 211. Thus, the timing of exposing a plurality of pixels 231 arranged in the pixel section 221 is controlled by the line driver 213 for each column to perform exposure by the rolling shutter scheme. Thus, a line of control performed by the line driver 213 on the pixel section 221 is arranged in the vertical direction (the direction of a column of the pixel section 221).

In the image sensor 211, the two-dimensionally arranged pixels 231 are exposed in accordance with the signal used to control the exposure timing and supplied by the line driver 213, and photoelectric conversion is performed by a photoelectric conversion element in the pixel section 221. Then, parallel processing is performed by the row-parallel AD converter section 222 with respect to an ADC in a row direction to obtain a signal value of a digital signal. With respect to the obtained signal value, a variation in reading timing between pixels is accommodated by the frame memory 223, and the obtained signal value is supplied by the frame memory 223 to the signal processor 214 for each frame.

On the basis of a parameter that is used to perform processing on a 2D-image signal and acquired from the register 212, the signal processor 214 performs 2D-image signal processing with respect to the signal value input by the image sensor 211 for each frame. A 2D image obtained by the 2D-image signal processing is output to the image fusing apparatus 40.

A distance image from the ranging apparatus 10 and a 2D image from the image-capturing apparatus 20 are input to the image fusing apparatus 40 in synchronization with each other. The image fusing apparatus 40 fuses the distance image and the 2D image, and outputs a resulting fusion image to the object recognizing apparatus 2 (FIG. 1).

(Example of Setting Register)

Next, a setting register is described in detail with reference to FIGS. 11 to 14.

Figure 11:
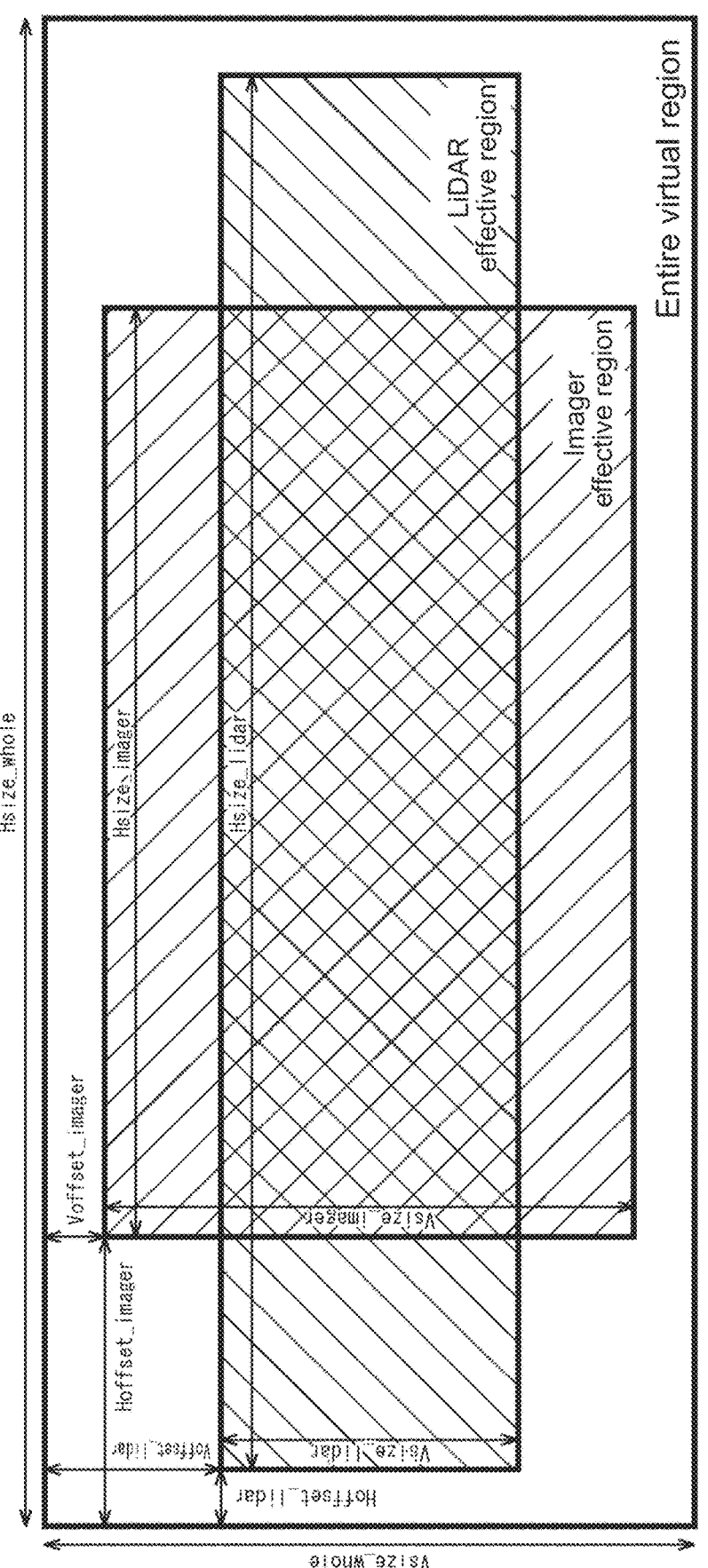
FIG. 11 illustrates an example of a setting register held in a setting register section included in a synchronization control apparatus.

FIG. 11 illustrates examples of parameters related to a synchronization timing control that are individually set by the setting register section 30B for the register 112 of the ranging apparatus 10 and for the register 212 of the image-capturing apparatus 20.

A virtual region that includes an imager effective region and a LiDAR effective region is set to be an entire virtual region. The entire virtual region is set by, for example, Vsize_whole and Hsize_whole that represent vertical and horizontal sizes.

The LiDAR effective region represents an effective region when the ranging apparatus 10 is LiDAR. With respect to the LiDAR effective region, the position and the size of the LiDAR effective region in the entire virtual region are set. The LiDAR effective region is set by, for example, Voffset_lidar and Hoffset_lidar, and Vsize_lidar and Hsize_lidar that respectively represent vertical and horizontal positions, and vertical and horizontal sizes.

A space in a group of LiDAR points is a space between points of the group of LiDAR points that is set on the basis of a coordinate system of the entire virtual region. The space in a group of LiDAR points is set by, for example, Vstep_lidar and Hstep_lidar that represent vertical and horizontal spaces. Note that the group of LiDAR points is a group of points, in (the SPAD section 121 of) the laser light receiver 114, at which reflected light from the object 3 is received by (the SPAD section 121 of) the laser light receiver 114.

The imager effective region represents an effective region when the image-capturing apparatus 20 is an imager. With respect to the imager effective region, the position and the size of the imager effective region in the entire virtual region are set. The imager effective region is set by, for example, Voffset_imager and Hoffset_imager, and Vsize_imager and Hsize_imager that respectively represent vertical and horizontal positions, and vertical and horizontal sizes.

A imager pixel space is a space between the pixels 231 that is set on the basis of the coordinate system of the entire virtual region. The imager pixel space is set by, for example, Vstep_imager and Hstep_imager that represent vertical and horizontal spaces.

FIG. 12 illustrates an example of a set value of a setting register of a synchronization timing control system when the ranging apparatus 10 and the image-capturing apparatus 20 have different effective regions.

Figure 13:
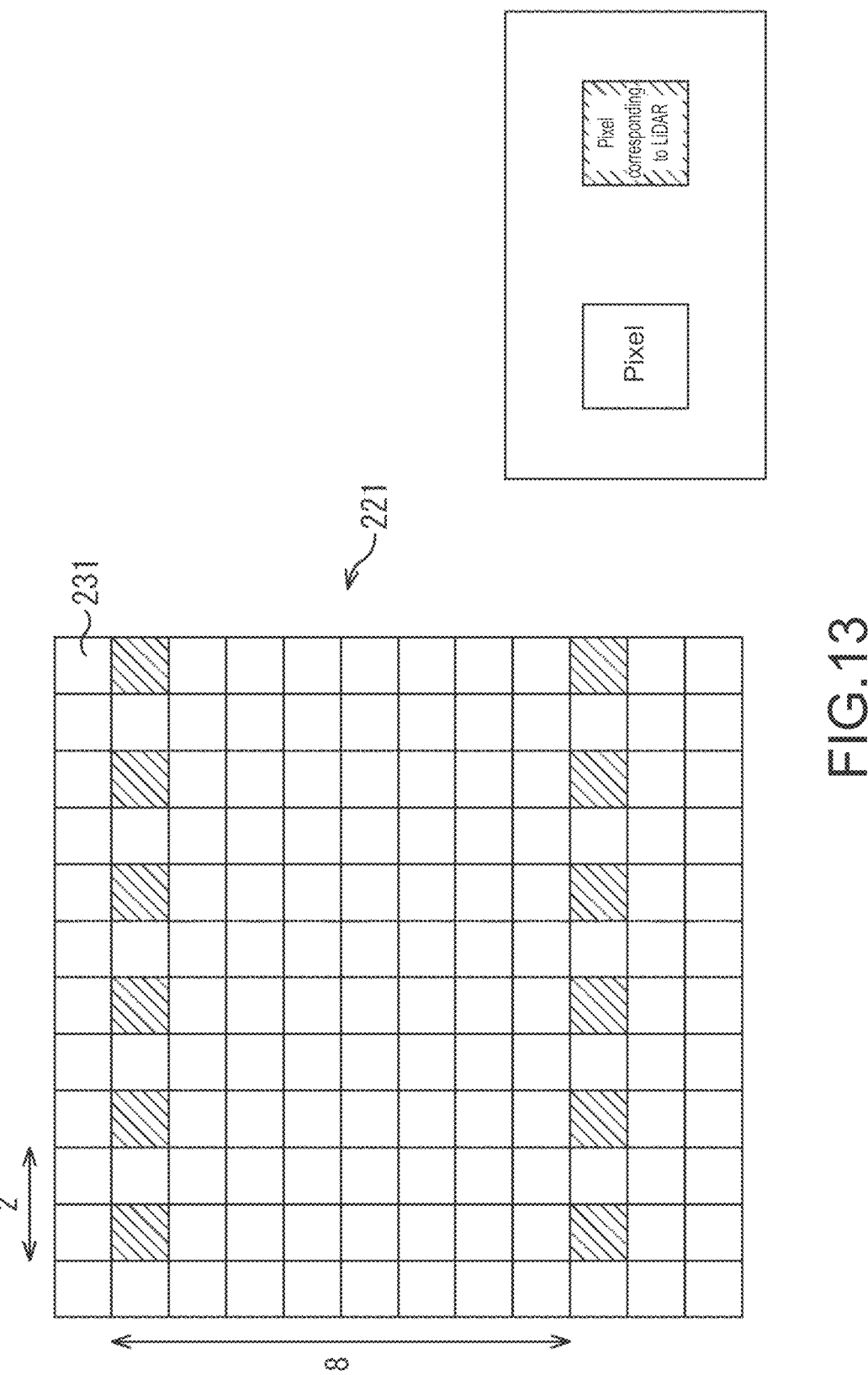
FIG. 13 illustrates an example of a relationship between a plurality of pixels arranged in a pixel section of the image sensor and a group of points, on a light-receiving surface of a laser light receiver, at which laser light is received.

In FIG. 12, the LiDAR effective region for the ranging apparatus 10 is set by "Vnum_lidar=64" and "Hnum_lidar=1280" that respectively represent the number of groups of effective points in the vertical direction and the number of groups of effective points in the horizontal direction. On the other hand, the imager effective region for the image-capturing apparatus 20 is set by "Vnum_imager=1080" and "Hnum_imager=1920" that respectively represent the number of effective pixels in the vertical direction and the number of effective pixels in the horizontal direction. In this case, a space in the group of effective points for the ranging apparatus 10 is represented by "Vstep_lidar=8" and "Hstep_lidar=2" when a space between effective pixels for the image-capturing apparatus 20 is represented by "Vstep_imager=1" and "Hstep_imager=1" (FIG. 13).

In other words, in the example of FIG. 12, the LiDAR effective region is set by "Vsize_lidar=512 (64×8)" and "Hsize_lidar=2560 (1280×2)" when the imager effective region is set by "Vsize_imager=1080" and "Hsize_imager=1920". Further, the entire virtual region is set as appropriate to include the LiDAR effective region and the imager effective region, and is set by "Vsize_whole=1080" and "Hsize_whole=2700" in the example of FIG. 12.

Further, in the example of FIG. 12, "Voffset_lidar=284" and "Hoffset_lidar=70" are set for the LiDAR effective region, and "Voffset_imager=0" and "Hoffset_imager=390" are set for the imager effective region.

Figure 14:
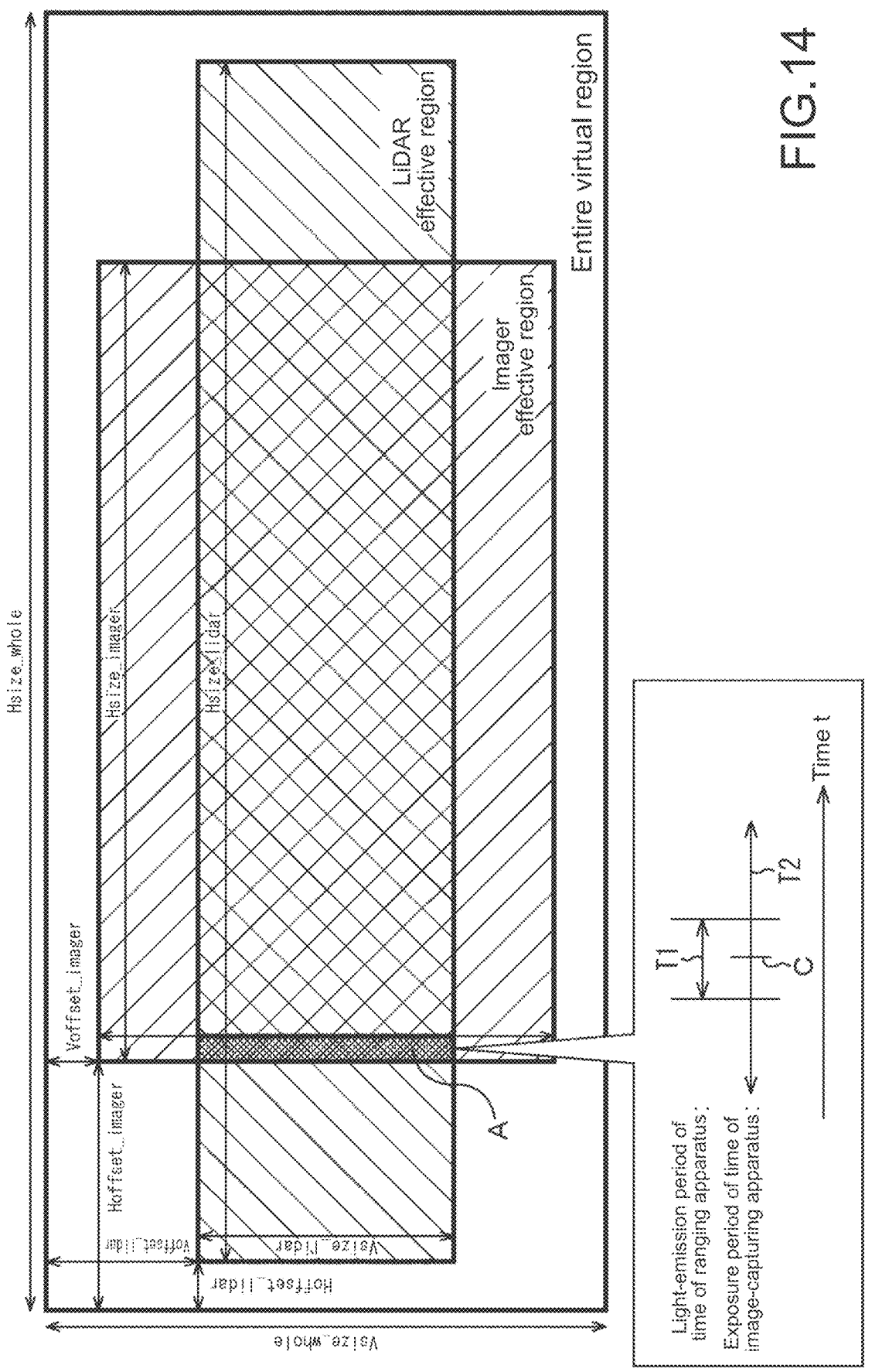
FIG. 14 illustrates an example of setting the number of exposure lines.

Here, as illustrated in FIG. 14, a period of time T2 for which (the image sensor 211 of) the image-capturing apparatus 20 performs exposure is normally longer in a specified column than a period of time T1 for which (the laser source section 111 of) the ranging apparatus 10 emits laser light. In this case, it is possible to perform setting such that the middle C of the exposure period of time T2 is within the light-emission period of time T1. This makes it possible to further improve the accuracy in synchronizing the ranging apparatus 10 and the image-capturing apparatus 20. Note that the exposure period of time of the image-capturing apparatus 20 can be set by, for example, a parameter of the number of exposure lines.

The specified column is a column that is situated in a region (for example, a region A) in which a LiDAR effective region and an imager effective region overlap, and corresponds to laser light emitted by the laser source section 111 of the ranging apparatus 10. The specified column is included in a region corresponding to a group of exposed pixels from among a plurality of pixels 231 arranged in the pixel section 221 of the image sensor 211 of the image-capturing apparatus 20.

(Examples of Synchronization of Ranging Apparatus and Image-Capturing Apparatus)

Next, the synchronization of the ranging apparatus 10 of horizontal back-and-forth scanning and the image-capturing apparatus 20 of a row-parallel ADC scheme is described in detail with reference to FIGS. 15 to 25.

In the image sensor 211 of the image-capturing apparatus 20, a plurality of pixels 231 two-dimensionally arranged in the pixel section 221 is exposed for each column by the rolling shutter scheme, and photoelectric conversion is performed by a photoelectric conversion element of each pixel 231 to obtain a signal value. With respect to the obtained signal value, parallel processing is performed by the row-parallel AD converter section 222 with respect to an ADC in the row direction to convert an analog signal into a digital signal.

Here, examples of a configuration of the row-parallel ADC scheme include a single-side ADC configuration (FIG. 15) in which the row-parallel AD converter section 222 is provided on a single side of the pixel section 221, and a both-side ADC configuration (FIG. 16) in which a row-parallel AD converter section 222-1, 222-2 is provided on both sides of the pixel section 221. Here, a small number of ADCs results in a decrease in throughput since an ADC is shared by time division by different lines in the rolling shutter scheme. However, it is possible to suppress the decrease in throughput by increasing a degree of parallelism of ADCs using, for example, the both-side ADC configuration.

Figure 15:
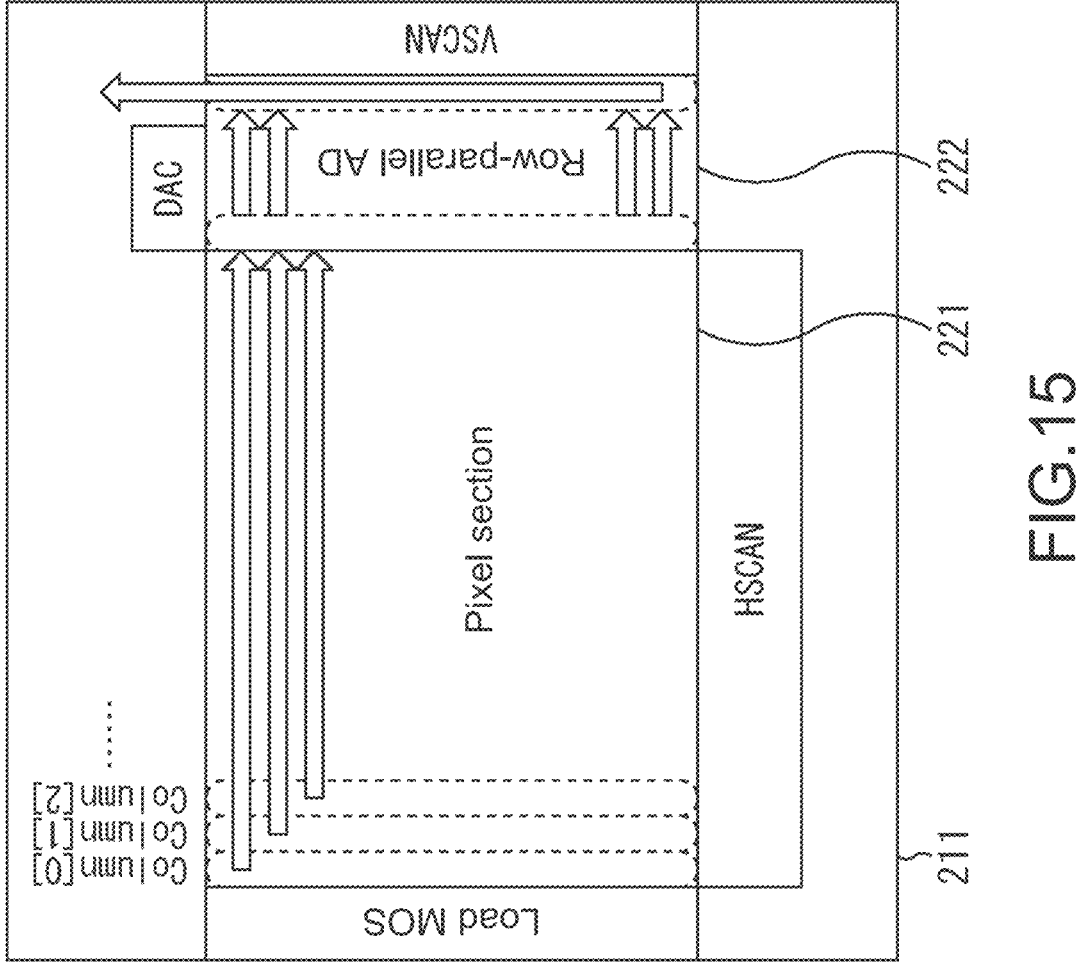
FIG. 15 illustrates a first example of the configuration of the image sensor using a row-parallel ADC scheme.
Figure 16:
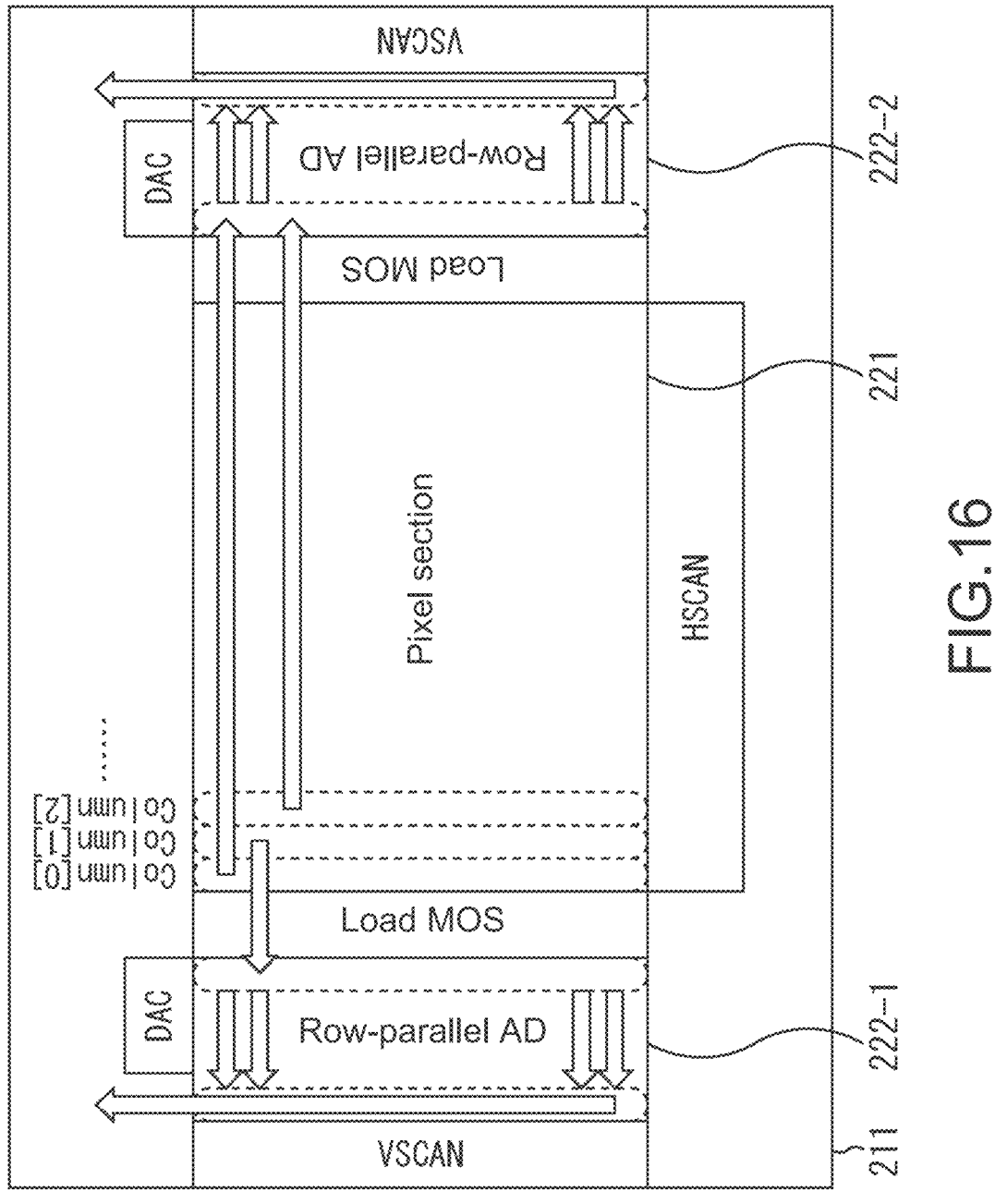
FIG. 16 illustrates a second example of the configuration of the image sensor using the row-parallel ADC scheme.

With respect to the pixels 231 in all of the columns arranged in the pixel section 221, parallel processing is performed by the row-parallel AD converter section 222 arranged on the single side with respect to an ADC in the row direction when the single-side ADC configuration illustrated in FIG. 15 is used. On the other hand, when the both-side ADC configuration illustrated in FIG. 16 is used, parallel processing is performed by one of the row-parallel AD converter sections, the row-parallel AD converter section 222-1, with respect to an ADC for a pixel 231, from among the plurality of pixels 231 arranged in the pixel section 221, that is included in a first column (for example, an even-numbered column), and parallel processing is performed by the other row-parallel AD converter section, the row-parallel AD converter section 222-2, with respect to an ADC for a pixel 231 included in a second column (for example, an odd-numbered column) that is a column other than the first column.

Further, in the row-parallel ADC scheme, an ADC is not allowed to be used in different columns at the same time since the plurality of pixels 231 arranged in the pixel section 221 shares an ADC in the column direction. In other words, there is a need to perform an exclusion control by time division for each column in the row-parallel ADC scheme when AD conversion is performed on each pixel 231 in each column of the pixel section 221, as illustrated in a timing chart of FIG. 17.

Figure 17:
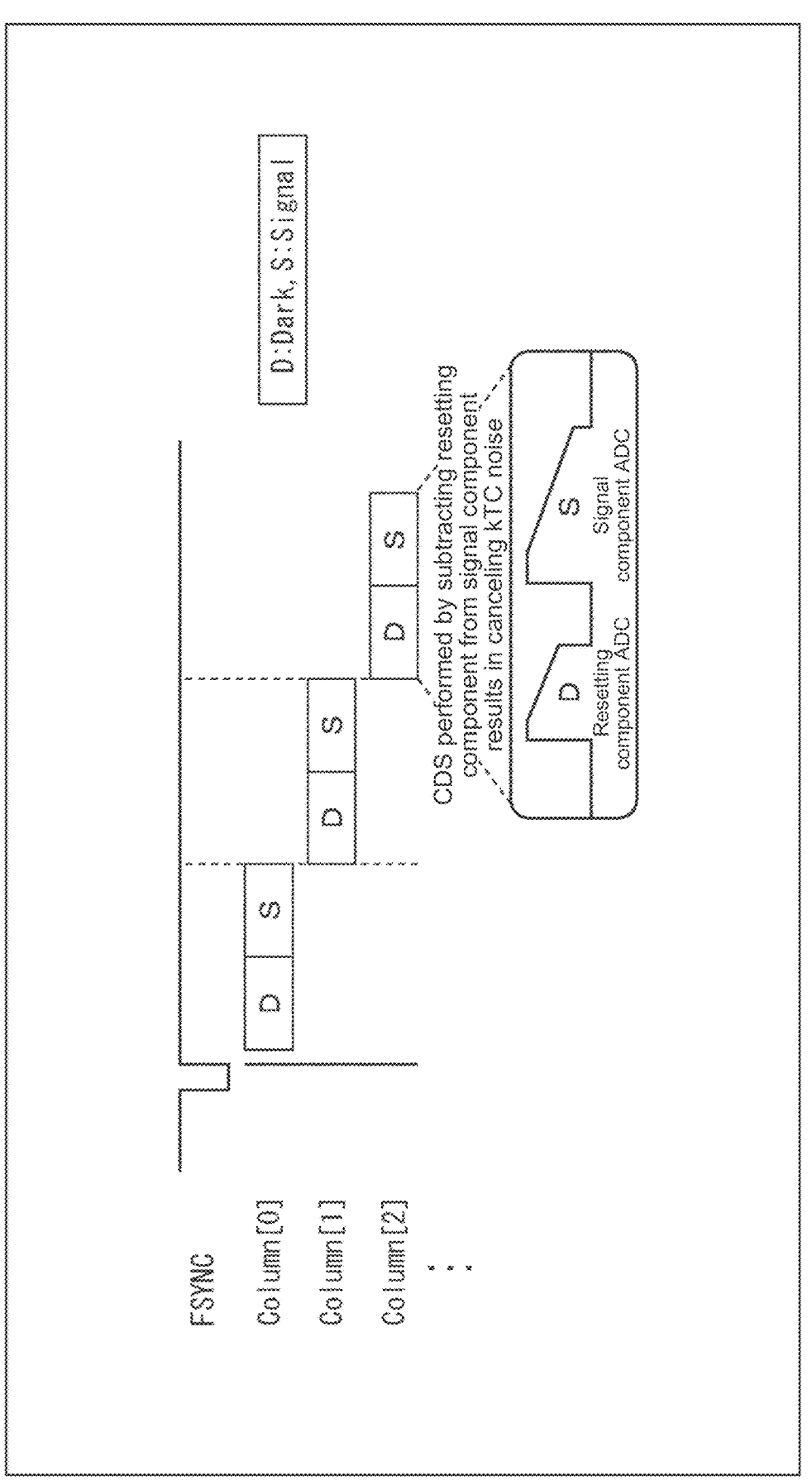
FIG. 17 is a timing chart illustrating an example of reading of a resetting component and a signal component in the image sensor using the row-parallel ADC scheme.

Note that, in the row-parallel AD converter section 222, a resetting component and a signal component of the pixel 231 are serially read for each pixel 231, and AD conversion is performed on each of the resetting component and the signal component. Then, the resetting component is subtracted from the signal component to perform an operation of correlated double sampling (CDS). This results in canceling kTC noise, as illustrated in FIG. 17.

Here, when the image-capturing apparatus 20 of a row-parallel ADC scheme is synchronized with the ranging apparatus 10 of horizontal back-and-forth scanning and when a blanking period of time between frames is shorter than an accumulation period of time, the exposure timing for each pixel 231 when left-right scanning is performed and the exposure timing for each pixel 231 when right-left scanning is performed overlap partially. Thus, one pixel 231 is not allowed to be continuously used during back-and-forth scanning.

Figure 18:
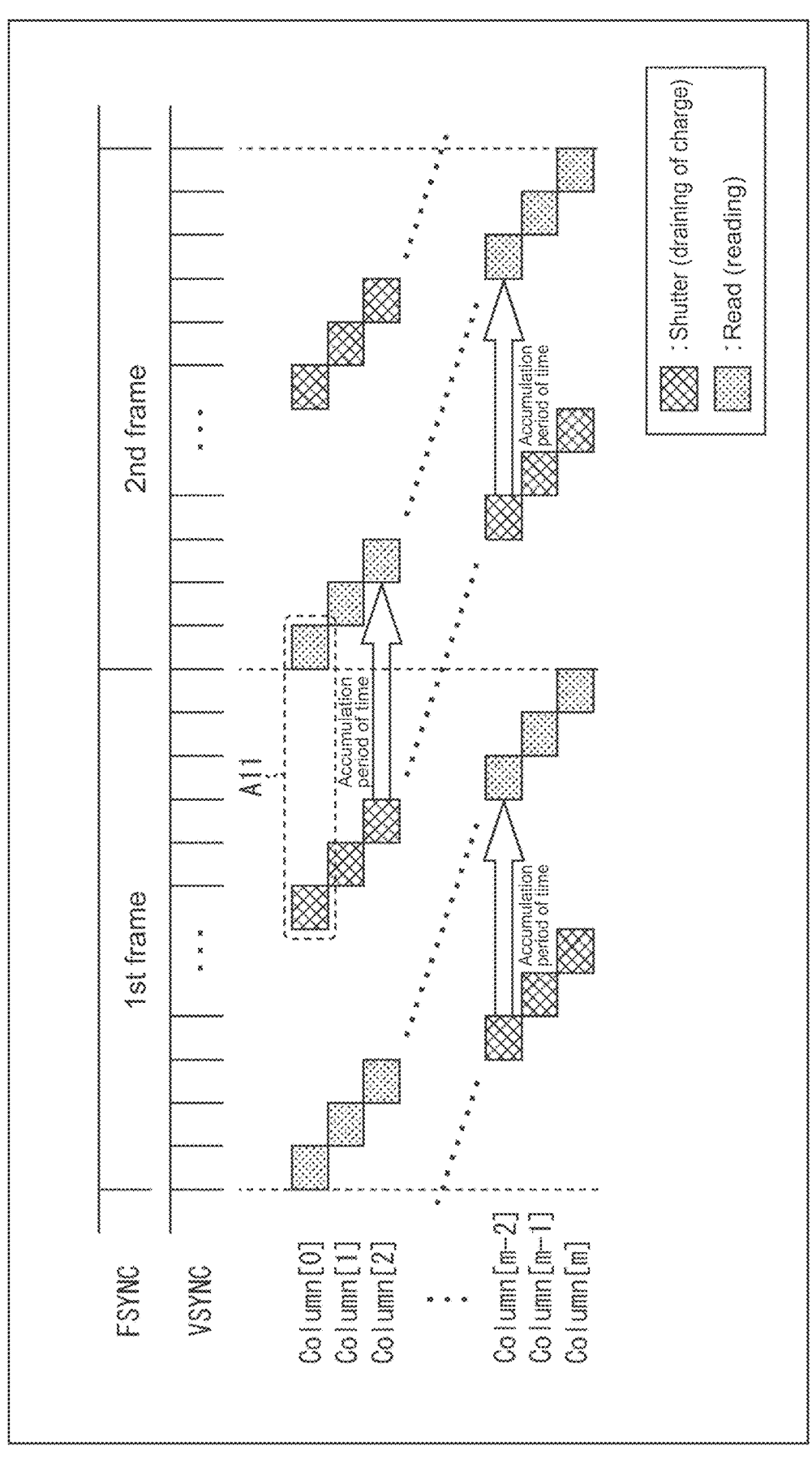
FIG. 18 is a timing chart illustrating an example of the exposure timing when scanning is performed from left to right.
Figure 19:
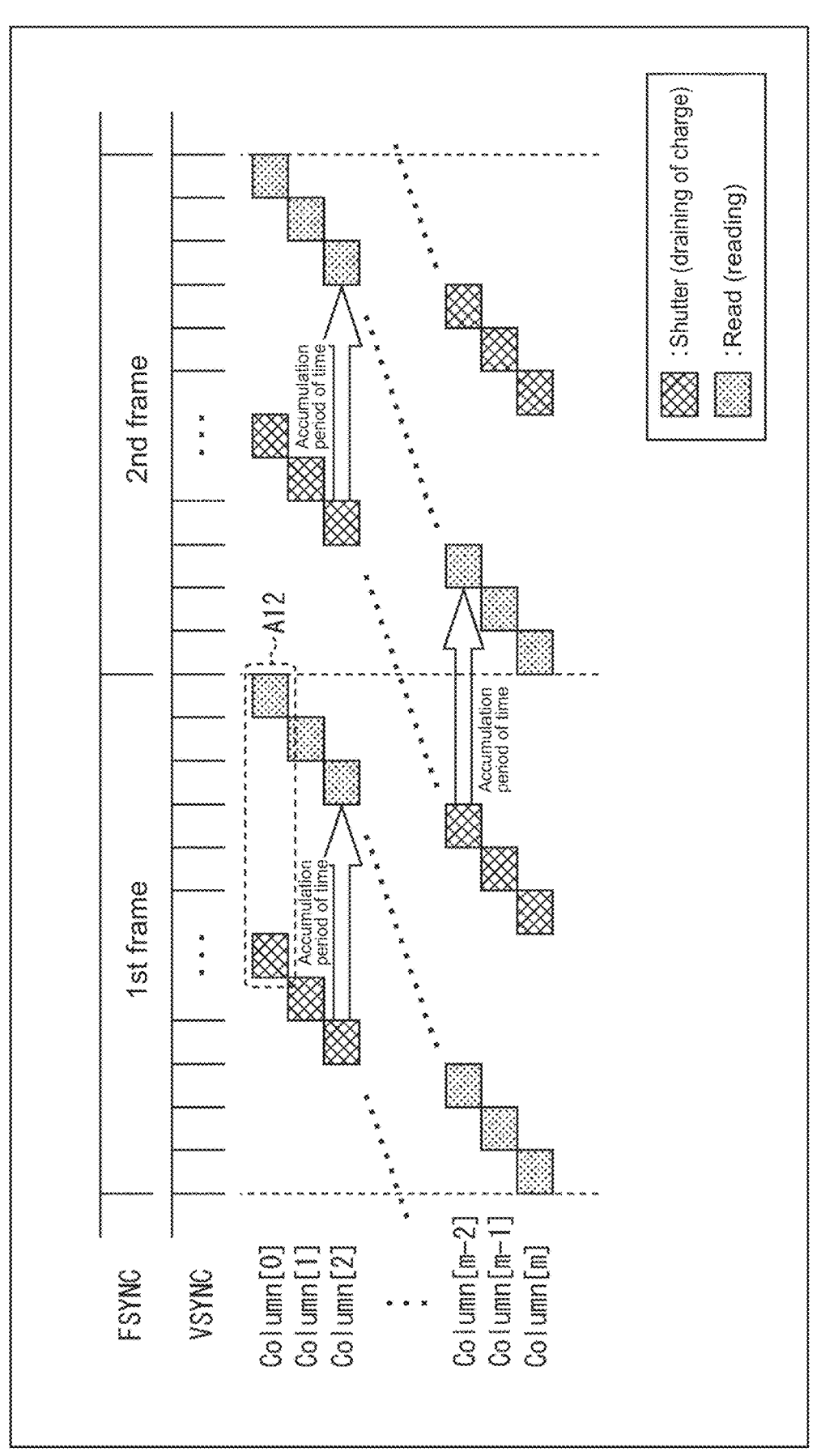
FIG. 19 is a timing chart illustrating an example of the exposure timing when scanning is performed from right to left.

Specifically, FIG. 18 is a timing chart of the exposure timing of the image-capturing apparatus 20 of a row-parallel ADC scheme in synchronization with the ranging apparatus 10 in which the scanning direction is fixed to a left-right scanning direction. On the other hand, FIG. 19 is a timing chart of the exposure timing of the image-capturing apparatus 20 of a row-parallel ADC scheme in synchronization with the ranging apparatus 10 in which the scanning direction is fixed to a right-left scanning direction. However, FIGS. 18 and 19 are timing charts when there exists no blanking period of time between frames. Further, the blanking period of time (Hoffset_L_imager representing a left blanking period of time, and Hoffset_R_imager representing a right blanking period of time) is represented with Hoffset_L_imager=Hoffset_imager, and Hoffset_R_imager=Hsize_whole-(Hoffset_imager+Hsize_imager), and any number of lines can be set by a setting register.

The timing charts of FIGS. 18 and 19 each illustrate a timing at which a charge is drained when a shutter operation is performed in the pixels 231 of columns Column[0] to Column[m] in an arbitrary row of the pixel section 221 (FIG. 15 or 16), and a timing at which a signal is read when a read operation is performed in the pixels 231 of the columns Column[0] to Column[m] in the arbitrary row, the timings being a timing at which a charge is drained and a timing at which a signal is read when temporally successive first and second frames that are image frames of a 2D image are captured (generated). Here, in each pixel 231, the period of time from the shutter operation being performed to the read operation being performed is a period of time of accumulating charges (a rightward arrow in the figure).

In FIG. 18, scanning is performed by the ranging apparatus 10 from left to right. Thus, correspondingly to the pixels 231 of the columns Column[0] to Column[m] in an arbitrary row, squares representing the shutter operation are successively situated diagonally downward right in ascending order of column number, and squares representing the read operation are successively situated diagonally downward right in ascending order of column number. On the other hand, in FIG. 19, scanning is performed by the ranging apparatus 10 from right to left. Thus, correspondingly to the pixels 231 of the columns Column[0] to Column[m] in an arbitrary row, squares representing the shutter operation are successively situated diagonally upward right in descending order of column number, and squares representing the read operation are successively situated diagonally upward right in descending order of column number.

Here, in portions in FIGS. 18 and 19 that are each situated around a boundary of the first and second frames in the pixel 231 of a leftmost column Column[0] in an arbitrary row, an accumulation period of time A12 in the leftmost column Column[0] corresponding to a last column for right-left scanning in the first frame of FIG. 19, and an accumulation period of time A11 in the leftmost column Column[0] corresponding to a beginning column for left-right scanning in the second frame of FIG. 18 overlap. Thus, one pixel 231 (the pixel 231 of the leftmost column Column[0] in an arbitrary row) is not allowed to be continuously used in the pixel section 221 during back-and-forth scanning.

Thus, the technology according to the present disclosure proposes two schemes that are a scheme using time division and a scheme using space division, in order to synchronize the ranging apparatus 10 of horizontal back-and-forth scanning and the image-capturing apparatus 20 of a row-parallel ADC scheme.

(Scheme Using Time Division)

First, the scheme using time division is described with reference to FIGS. 20 and 21.

The scheme using time division is a scheme in which the exposure timing is switched between left-right scanning and right-left scanning. Here, as illustrated in, for example, FIG. 11, the LiDAR effective region and the imager effective region have different horizontal sizes (for example, Hsize_lidar=2560 and Hsize_imager=1920). Thus, in the scheme using time division, the accumulation period of time is also secured in the pixels 231 in leftmost and rightmost columns using the blanking period of time (for example, Hoffset_imager=390).

Figure 20:
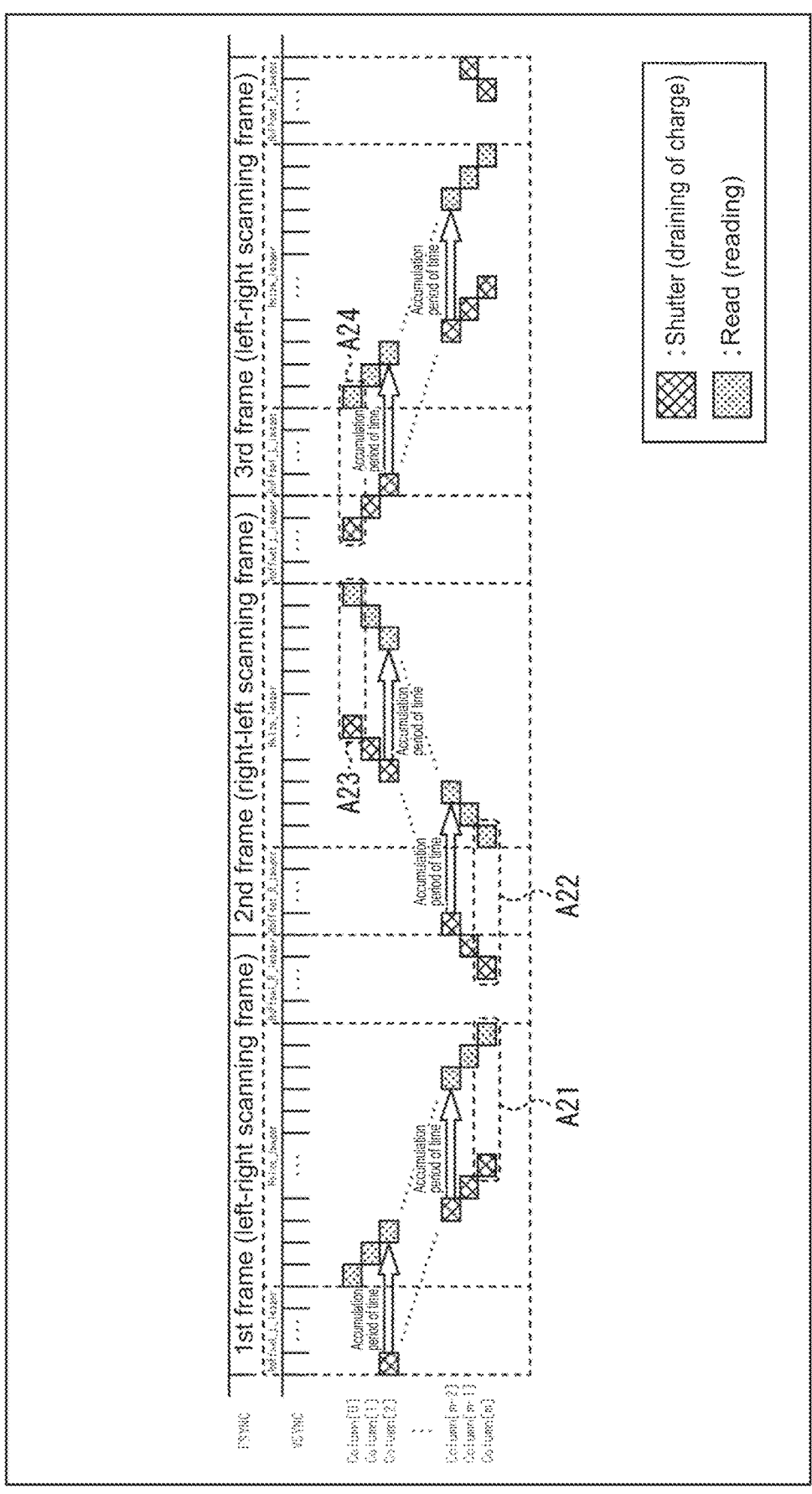
FIG. 20 is a timing chart illustrating a first example of switching of the exposure timing upon applying a scheme using time division that uses a blanking period of time.

The timing chart of FIG. 20 illustrates a timing at which a charge is drained when a shutter operation is performed in the pixels 231 (of columns Column[0] to Column[m]) in an arbitrary row of the pixel section 221, and a timing at which a signal is read when a read operation is performed in the pixels 231 (of the columns Column[0] to Column[m]) in the arbitrary row, the timings being a timing at which a charge is drained and a timing at which a signal is read when temporally successive first, second, and third frames that are image frames of a 2D image are captured (generated).

In the first and third frames illustrated in FIG. 20, scanning is performed by the ranging apparatus 10 from left to right. Thus, correspondingly to the pixels 231 of the columns Column[0] to Column[m] in an arbitrary row, squares representing the shutter operation are successively situated diagonally downward right in ascending order of column number, and squares representing the read operation are successively situated diagonally downward right in ascending order of column number. On the other hand, in the second frame illustrated in FIG. 20, scanning is performed by the ranging apparatus 10 from right to left. Thus, correspondingly to the pixels 231 of the columns Column[0] to Column[m] in an arbitrary row, squares representing the shutter operation are successively situated diagonally upward right in descending order of column number, and squares representing the read operation are successively situated diagonally upward right in descending order of column number.

Here, in regions of Hoffset_imager (Hoffset_R_imager representing a right blanking period of time, and Hoffset_L_imager representing a left blanking period of time) obtained by excluding a region of Hsize_imager from scanning frames in each frame, one pixel 231 can be continuously used during back-and-forth scanning when a period of time of Hoffset_imager (a blanking period of time) with respect to accumulation periods of time is sufficiently long and when accumulation periods of time in previous and subsequent frames do not overlap upon reversing the scanning direction.

In other words, in a portion in FIG. 20 that is situated around a boundary of the first and second frames in the pixel 231 of a rightmost column Column[m] in an arbitrary row, an accumulation period of time A21 in the rightmost column Column[m] corresponding to a last column for left-right scanning in the first frame, and an accumulation period of time A22 in the rightmost column Column[m] corresponding to a beginning column for right-left scanning in the second frame do not overlap. Thus, the pixel 231 of the rightmost column Column[m] can be continuously used during back-and-forth scanning. In this case, accumulation periods of time in the first and second frames will not overlap upon reversing the scanning direction when a certain period of time with respect to the accumulation periods of time is sufficiently long (is equal to or longer than a specified period of time), the certain period of time with respect to the accumulation periods of time corresponding to a right blanking period of time of the first frame that is generated upon performing left-right scanning, and a right blanking period of time of the second frame that is generated upon performing subsequent right-left scanning.

Further, in a portion in FIG. 20 that is situated around a boundary of the second and third frames in the pixel 231 of a leftmost column Column[0] in an arbitrary row, an accumulation period of time A23 in the leftmost column Column[0] corresponding to a last column for right-left scanning in the second frame, and an accumulation period of time A24 in the leftmost column Column[0] corresponding to a beginning column for left-right scanning in the third frame do not overlap. Thus, the pixel 231 of the leftmost column Column[0] can be continuously used during back-and-forth scanning. In this case, accumulation periods of time in the second and third frames will not overlap upon reversing the scanning direction when a certain period of time with respect to the accumulation periods of time is sufficiently long (is equal to or longer than a specified period of time), the certain period of time with respect to the accumulation periods of time corresponding to a left blanking period of time of the second frame that is generated upon performing right-left scanning and a left blanking period of time of the third frame that is generated upon performing subsequent left-right scanning.

Note that, in the example of FIG. 20, the left blanking period of time satisfies the following: Hoffset_L_imager=Hoffset_imager. Further, the right blanking period of time satisfies the following: Hoffset_R_imager=Hsize_whole-(Hoffset_imager+Hsize_imager).

Further, as an example of synchronizing the reading timing of the image-capturing apparatus 20 with the ranging timing (not illustrated) of the ranging apparatus 10, FIG. 20 illustrates an example in which the time phase has not been adjusted. However, the accumulation period of time of the image-capturing apparatus 20 is actually oriented toward a past direction from a reading point in time. Thus, if the reading timing of the image-capturing apparatus 20 is synchronized with the ranging timing of the ranging apparatus 10, the time phase of the image-capturing apparatus 20 will be shifted from the ranging apparatus 10 in the past direction. Therefore, FIG. 21 illustrates an example in which the time phase has been adjusted.

Figure 21:
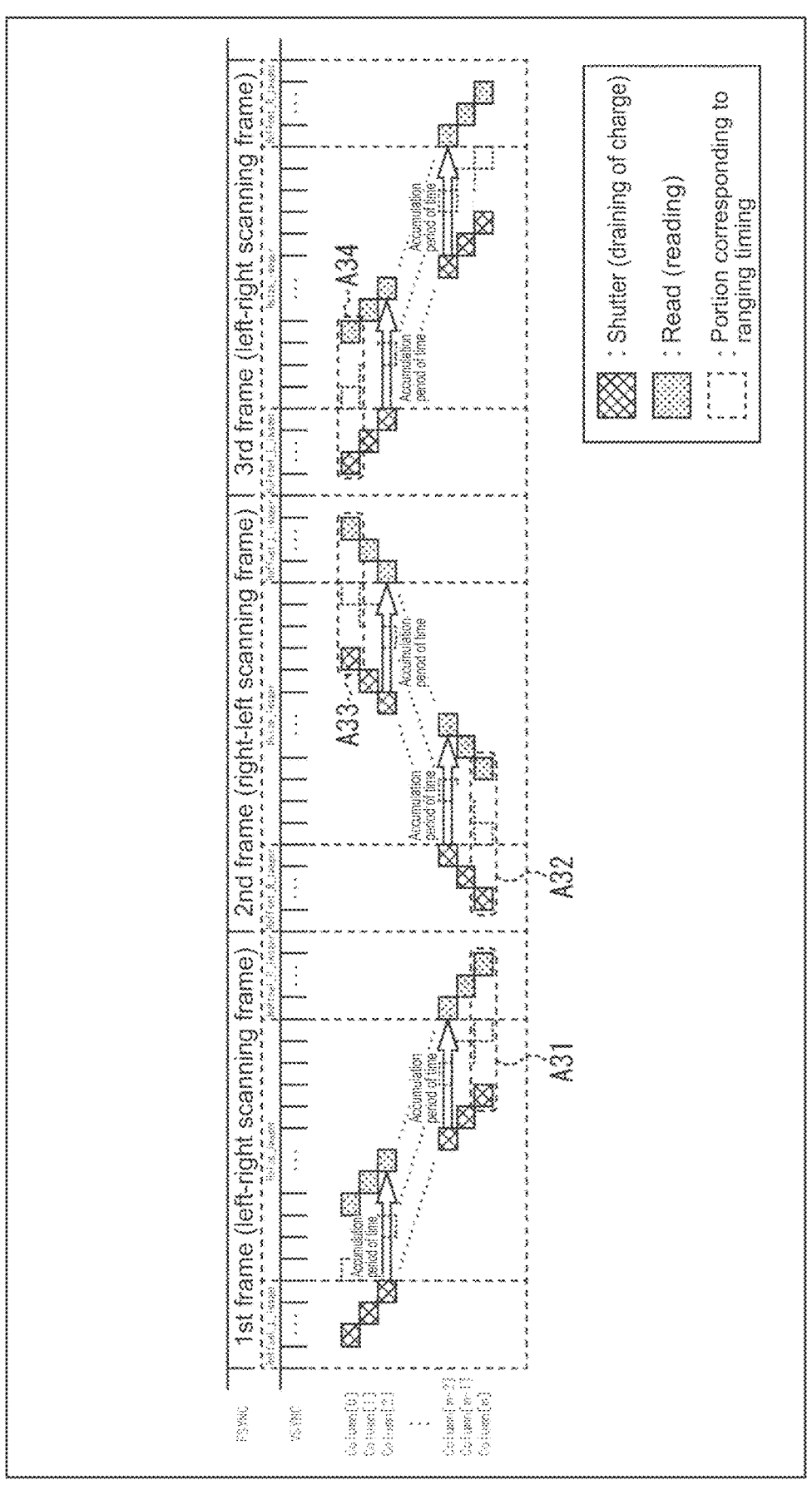
FIG. 21 is a timing chart illustrating a second example of switching of the exposure timing upon applying the scheme using time division that uses a blanking period of time.

FIG. 21 illustrates an example in which a portion corresponding to a timing of ranging performed by the ranging apparatus 10 is represented by a dotted square, which is different from the example of FIG. 20. Further, in the example of FIG. 21, a timing at which a charge is drained when a shutter operation is performed, and a timing at which a signal is read when a read operation is performed are adjusted such that the time phase of the image-capturing apparatus 20 is consistent with the ranging timing. Here, for example, control is performed in the image-capturing apparatus 20 such that the timing at which a charge is drained and the timing at which a signal is read are delayed by a period of time that corresponds to (approximately) half the accumulation period of time. This makes it possible to adjust the time phase such that the middle of the accumulation period of time of the image-capturing apparatus 20 is adjusted to the timing of ranging performed by the ranging apparatus 10. This adjustment results in being able to further improve the accuracy in synchronization of the ranging apparatus 10 and the image-capturing apparatus 20.

In other words, in a portion in FIG. 21 that is situated around a boundary of first and second frames in the pixel 231 of a rightmost column Column[m] in an arbitrary row, an accumulation period of time A31 in the rightmost column Column[m] corresponding to a last column for left-right scanning in the first frame, and an accumulation period of time A32 in the rightmost column Column[m] corresponding to a beginning column for right-left scanning in the second frame do not overlap. Thus, the pixel 231 of the rightmost column Column[m] can be continuously used during back-and-forth scanning. Further, in this case, a certain period of time with respect to the accumulation periods of time is sufficiently long (is equal to or longer than a specified period of time), the certain period of time with respect to the accumulation periods of time corresponding to a right blanking period of time of the first frame and a right blanking period of time of the second frame. Furthermore, the timing at which a charge is drained and the timing at which a signal is read are delayed by a period of time that corresponds to approximately half the accumulation period of time. This results in adjusting the time phase such that the middle of the accumulation period of time of the image-capturing apparatus 20 is adjusted to the timing of ranging performed by the ranging apparatus 10.

Further, in a portion in FIG. 21 that is situated around a boundary of the second frame and a third frame in the pixel 231 of a leftmost column Column[0] in an arbitrary row, an accumulation period of time A33 in the leftmost column Column[0] corresponding to a last column for right-left scanning in the second frame, and an accumulation period of time A34 in the leftmost column Column[0] corresponding to a beginning column for left-right scanning in the third frame do not overlap. Thus, the pixel 231 of the leftmost column Column[0] can be continuously used during back-and-forth scanning. Further, in this case, a certain period of time with respect to the accumulation periods of time is sufficiently long (is equal to or longer than a specified period of time), the certain period of time with respect to the accumulation periods of time corresponding to a left blanking period of time of the second frame and a left blanking period of time of the third frame. Furthermore, the timing at which a charge is drained and the timing at which a signal is read are delayed by a period of time that corresponds to approximately half the accumulation period of time. This results in adjusting the middle of the accumulation period of time of the image-capturing apparatus 20 to the timing of ranging performed by the ranging apparatus 10.

As described above, the use of the scheme using time division enables the image-capturing apparatus 20 to continuously use, during back-and-forth scanning performed by the ranging apparatus 10, any pixel 231 (for example, the pixel 231 of a leftmost column Column[0] or a rightmost column Column[m] in an arbitrary row) arranged in the pixel section 221 of the image sensor 211, in order to synchronize the ranging apparatus 10 of horizontal back-and-forth scanning and the image-capturing apparatus 20 of a row-parallel ADC scheme. In this case, it is favorable that the time phase be adjusted in the image-capturing apparatus 20 such that the middle of the accumulation period of time of the image-capturing apparatus 20 is adjusted to the timing of ranging performed by the ranging apparatus 10.

(Scheme Using Space Division)

Next, the scheme using space division is described with reference to FIGS. 22 to 25.

The scheme using space division is a scheme in which a plurality of pixels 231 arranged in the pixel section 221 is spatially divided into a pixel for left-right scanning and a pixel for right-left scanning, and switching is performed with respect to the reading pixel and the exposure timing according to the scanning direction.

Here, as described above, the number of pixels that can be acquired by the image-capturing apparatus 20 in a target region of the object 3 is generally larger than the number of groups of points acquired by the ranging apparatus 10.

Figure 22:
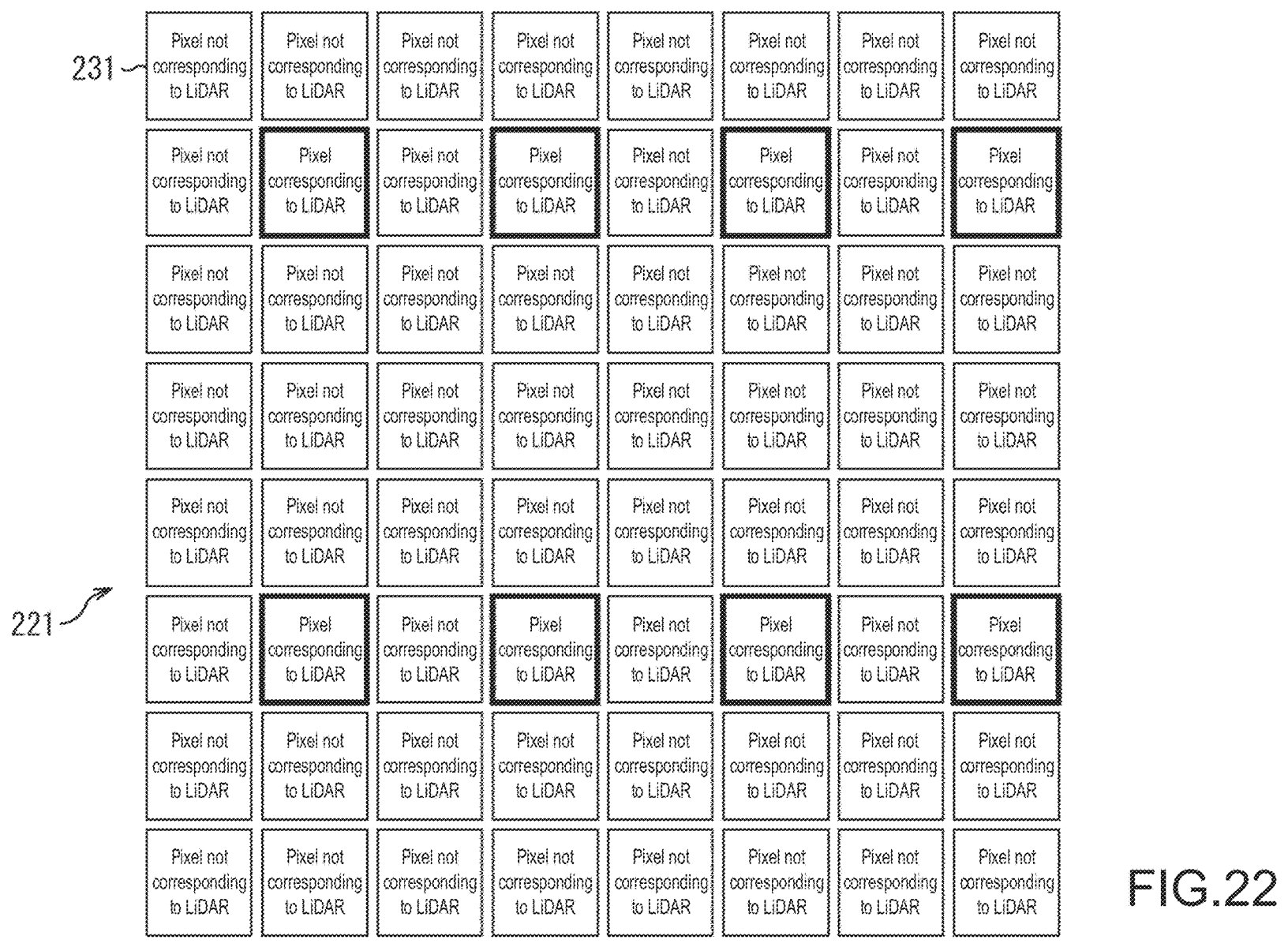

In this case, a plurality of pixels 231 two-dimensionally arranged in the pixel section 221 of the image sensor 211 of the image-capturing apparatus 20 has, for example, a correspondence relationship illustrated in FIG. 22. In other words, from among the plurality of pixels 231 arranged in the pixel section 221, the pixel 231 corresponding to the position of a group of points acquired by the ranging apparatus 10 is referred to as a "pixel corresponding to LiDAR", and the pixel 231 not corresponding to the position of a group of points acquired by the ranging apparatus 10 is referred to as a "pixel not corresponding to LiDAR" in FIG. 22. For example, FIG. 22 illustrates an example in which the space between effective pixels for the image-capturing apparatus 20 is represented by "Vstep_imager=1" and "Hstep_imager=1", whereas the space in a group of effective points for the ranging apparatus 10 is represented by "Vstep_lidar=4" and "Hstep_lidar=2".

As illustrated in FIG. 22, there exists a larger number of excessive pixels ("pixels not corresponding to LiDAR") in the vertical direction in the pixel section 221 since it is often the case that, with respect to the position of a group of points acquired by the ranging apparatus 10, points are situated densely in the horizontal direction and sparsely in the vertical direction. Further, from among the plurality of pixels 231 arranged in the pixel section 221, the exposure timing of the pixel 231 corresponding to the position of a group of points acquired by the ranging apparatus 10 ("pixel corresponding to LiDAR") is synchronized with (the ranging timing of) the ranging apparatus 10. However, there are various ways of using an excessive pixel not corresponding to the position of a group of points acquired by the ranging apparatus 10 ("pixel not corresponding to LiDAR"). Normally, a sufficient recognition performance is not provided only by the number of groups of points acquired by the ranging apparatus 10. Thus, it is conceivable to synchronize a portion of or all of the excessive pixels of the image-capturing apparatus 20 with the ranging apparatus 10 to improve the fusion recognition rate.

Thus, in the scheme using space division, an excessive pixel of the image-capturing apparatus 20 is used as a pixel for left-right scanning or a pixel for right-left scanning to capture an image synchronized with left-right scanning and an image synchronized with right-left scanning in parallel, in order to synchronize the ranging apparatus 10 of horizontal back-and-forth scanning and the image-capturing apparatus 20 of a row-parallel ADC scheme. Note that, in order to apply the scheme using space division, there is a need to design a hardware circuit in advance such that the exposure time, the reading timing, and the like for the image synchronized with left-right scanning can be controlled separately from those for the image synchronized with right-left scanning.

FIG. 23 illustrates an example of simultaneously capturing images corresponding to different scanning directions in parallel using the scheme using space division. Here, FIG. 23 illustrates an example of performing a vertical space division into a pixel for left-right scanning and a pixel for right-left scanning using a larger number of excessive pixels existing in the vertical direction.

In FIG. 23, "Pixel_LiDAR_LR(m,n)" given in squares corresponding to a plurality of pixels 231 two-dimensionally arranged in the pixel section 221 of the image sensor 211 of the image-capturing apparatus 20 represents the pixel 231 used for an image synchronized with left-right scanning, and "Pixel_LiDAR_RL(m,n)" given in squares corresponding to the plurality of pixels 231 two-dimensionally arranged in the pixel section 221 of the image sensor 211 of the image-capturing apparatus 20 represents the pixel 231 used for an image synchronized with right-left scanning.

In FIG. 23, a region for an image synchronized with left-right scanning and a region for an image synchronized with right-left scanning are repeatedly placed alternately every two rows in the horizontal direction. The region for an image synchronized with left-right scanning includes the pixel 231 for an image synchronized with left-right scanning (a pixel corresponding to an excessive pixel, and a pixel corresponding to a "pixel corresponding to LiDAR" boxed with a bold line in the figure). The region for an image synchronized with right-left scanning includes the pixel 231 for an image synchronized with right-left scanning (a pixel corresponding to an excessive pixel).

Figure 24:
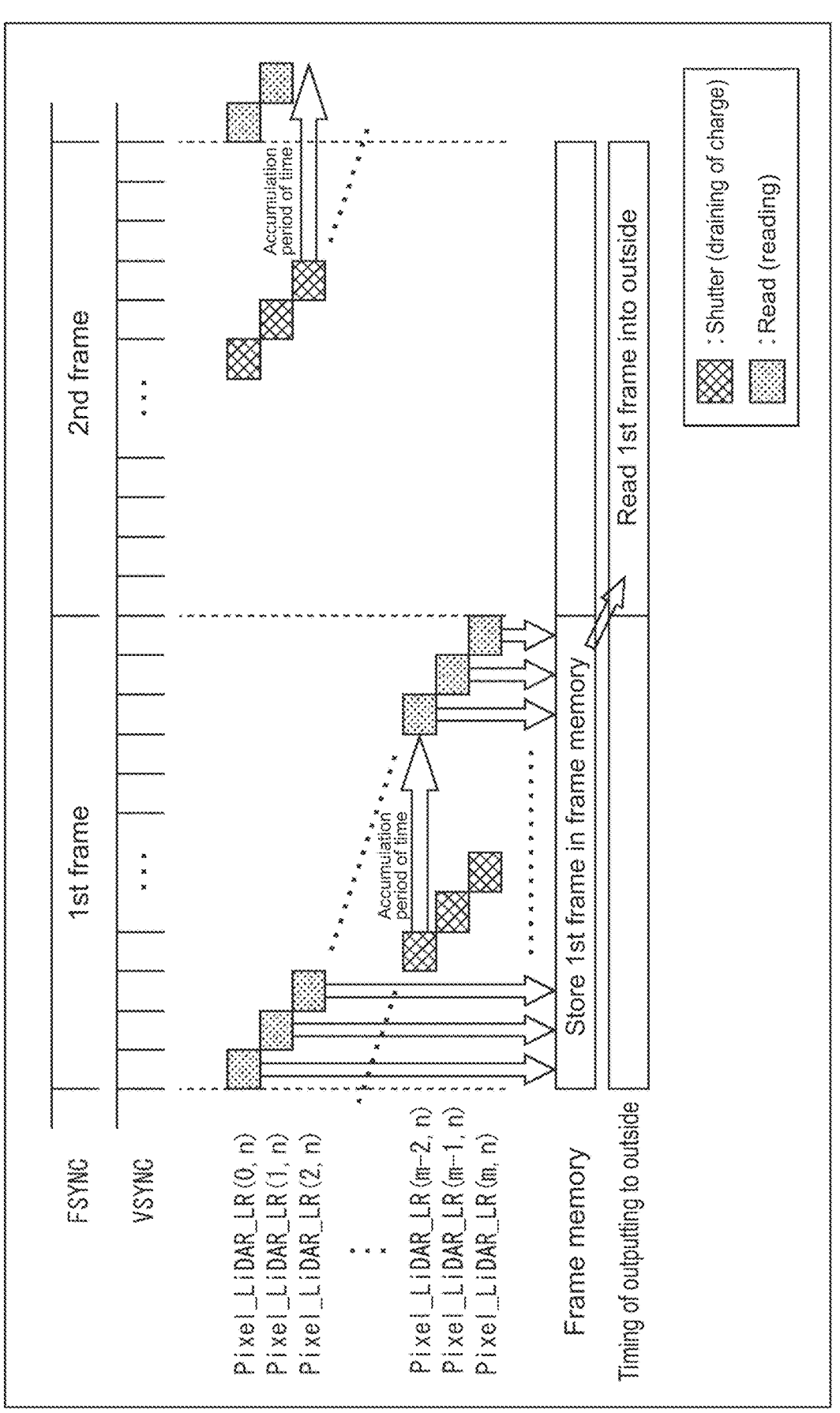
FIG. 24 is a timing chart illustrating a first example of switching of the exposure timing when the scheme using space division is used.

A timing chart of FIG. 24 illustrates an exposure timing in the pixel 231 (Pixel_LiDAR_LR(m,n)) of a region for an image synchronized with left-right scanning in the pixel section 221, the exposure timing being a timing of exposure performed when temporally successive first and second frames that are image frames of a 2D image captured by the image-capturing apparatus 20, are captured (generated).

In FIG. 24, exposure synchronized with left-right scanning performed by the ranging apparatus 10 is performed in the first frame. Thus, correspondingly to the pixels 231 (Pixel_LiDAR_LR(m,n)) for an image synchronized with left-right scanning in an arbitrary row, squares representing the shutter operation are successively situated diagonally downward right in ascending order of column number, and squares representing the read operation are successively situated diagonally downward right in ascending order of column number, such that a read operation is performed in the first frame. Note that, here, the period of time from the shutter operation being performed to the read operation being performed is also a period of time of accumulating charges (a rightward arrow in the figure).

As described above, in the image-capturing apparatus 20, the shutter operation and the read operation are performed, AD conversion is performed by the row-parallel AD converter section 222 with respect to a value of a read signal, and (a signal value of) a first frame is stored in the frame memory 223.

Here, the scanning direction is reversed for each frame in the ranging apparatus 10 of horizontal back-and-forth scanning. Thus, in the image-capturing apparatus 20 of a row-parallel ADC scheme, an operation synchronized with left-right scanning is performed upon capturing a first frame, and then an operation synchronized with right-left scanning is performed upon capturing a second frame.

Note that (the signal value of) the first frame stored in the frame memory 223 upon capturing the first frame is read into the external signal processor 214 at the timing of capturing the second frame. Then, 2D-image signal processing is performed by the signal processor 214 to generate an image frame of the first frame. The image frame (2D image) is an image synchronized with left-right scanning.

Figure 25:
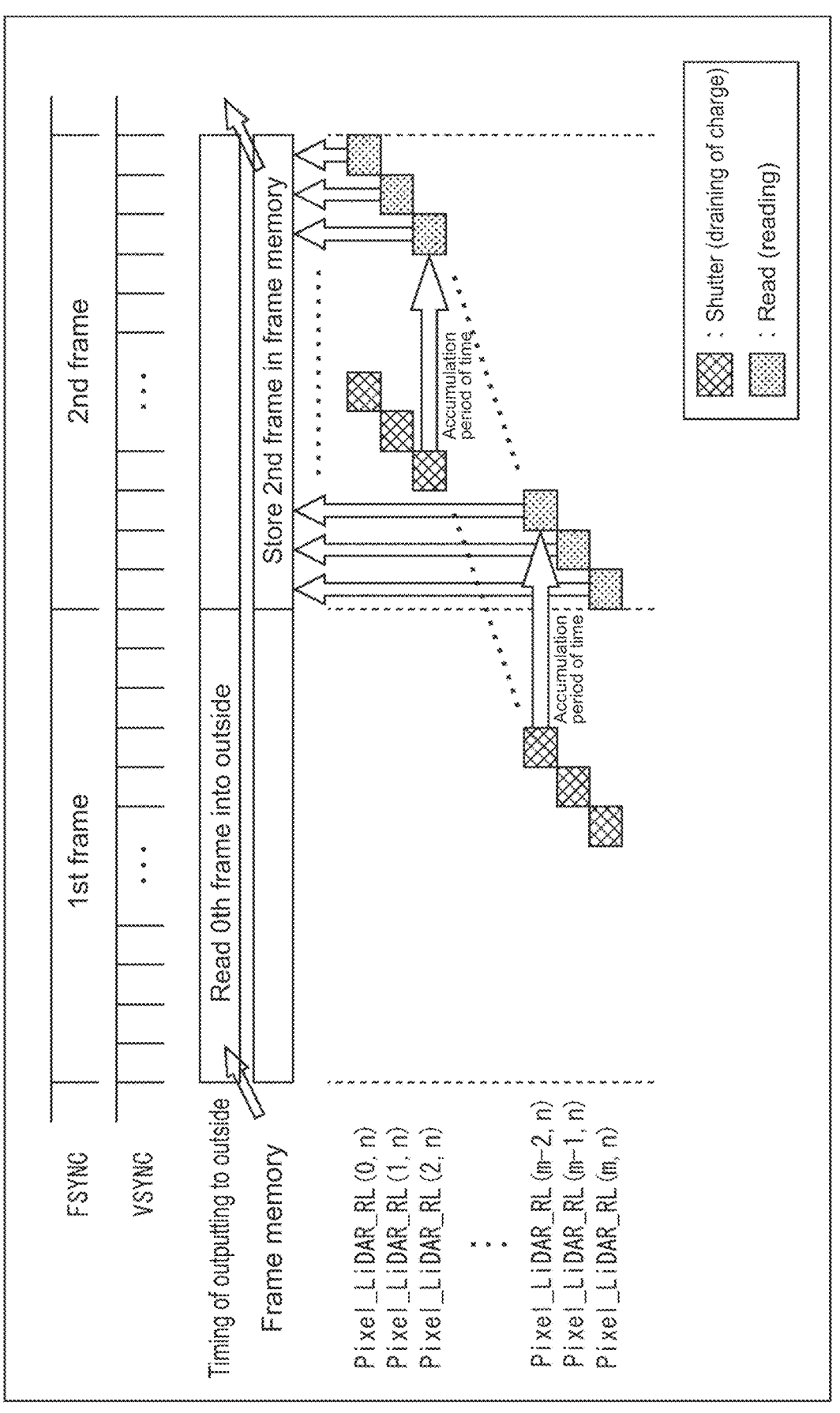
FIG. 25 is a timing chart illustrating a second example of the switching of the exposure timing when the scheme using space division is used.

A timing chart of FIG. 25 illustrates an exposure timing in the pixel 231 (Pixel_LiDAR_RL(m,n)) of a region for an image synchronized with right-left scanning in the pixel section 221, the exposure timing being a timing of exposure performed when temporally successive first and second frames that are image frames of a 2D image captured by the image-capturing apparatus 20, are captured (generated).

In FIG. 25, exposure synchronized with right-left scanning performed by the ranging apparatus 10 is performed in the second frame. Thus, correspondingly to the pixels 231 (Pixel_LiDAR_RL(m,n)) for an image synchronized with right-left scanning in an arbitrary row, squares representing the shutter operation are successively situated diagonally upward right in descending order of column number, and squares representing the read operation are successively situated diagonally upward right in descending order of column number, such that a read operation is performed in the second frame.

As described above, in the image-capturing apparatus 20, the shutter operation and the read operation are performed, AD conversion is performed by the row-parallel AD converter section 222 with respect to a value of a read signal, and (a signal value of) a second frame is stored in the frame memory 223. Then, (the signal value of) the second frame is read from the frame memory 223 at the timing of capturing a third frame. Then, 2D-image signal processing is performed by the signal processor 214 to generate an image frame of the second frame. The image frame (2D image) is an image synchronized with right-left scanning.

Note that descriptions of the third frame and the subsequent frames are omitted since the same applies to those frames. When an odd-numbered frame such as the third frame is captured by the image-capturing apparatus 20, image-capturing is performed in synchronization with left-right scanning performed by the ranging apparatus 10 using the pixel 231 (Pixel_LiDAR_LR(m,n)) of a region for an image synchronized with left-right scanning in the pixel section 221, as illustrated in the timing chart of FIG. 24. This results in obtaining a signal value of the image synchronized with left-right scanning.

Further, when an even-numbered frame such as a fourth frame is captured by the image-capturing apparatus 20, image-capturing is performed in synchronization with right-left scanning performed by the ranging apparatus 10 using the pixel 231 (Pixel_LiDAR_RL(m,n)) of a region for an image synchronized with right-left scanning in the pixel section 221, as illustrated in the timing chart of FIG. 25. This results in obtaining a signal value of the image synchronized with right-left scanning.

As described above, the use of the scheme using space division enables the image-capturing apparatus 20 to perform, during back-and-forth scanning performed by the ranging apparatus 10, switching with respect to the reading pixel and the exposure timing according to the direction of the scanning, in order to synchronize the ranging apparatus 10 of horizontal back-and-forth scanning and the image-capturing apparatus 20 of a row-parallel ADC scheme, the switching being performed between a group of pixels of a region for an image synchronized with left-right scanning in the pixel section 221 (a group of pixels including an excessive pixel) and a group of pixels of a region for an image synchronized with right-left scanning in the pixel section 221 (a group of pixels including an excessive pixel). This makes it possible to prevent a phenomenon in which the exposure timing in the pixel 231 upon performing left-right scanning and the exposure timing in the pixel 231 upon performing right-left scanning partially overlap in the image-capturing apparatus 20 of a row-parallel ADC scheme in synchronization with the ranging apparatus 10 of horizontal back-and-forth scanning (FIGS. 18 and 19). Note that the scheme using space division makes it possible to continuously acquire an image synchronized with left-right scanning and an image synchronized with right-left scanning that are repeatedly alternately captured, regardless of the length of a blanking period of time between frames.

The sensor fusion system of the present disclosure has been described above. According to the present disclosure, the sensor fusion system has the following configuration.

That is, the sensor fusion system of the present disclosure (the sensor fusion system 1 of FIG. 10) includes a ranging apparatus (the ranging apparatus 10 of FIG. 10), an image-capturing apparatus (the image-capturing apparatus 20 of FIG. 10), and a synchronization controller (the timing generator 30A of FIG. 10) that controls synchronization of the ranging apparatus and the image-capturing apparatus.

The ranging apparatus (the ranging apparatus 10 of FIG. 10) includes a light source module (the laser source section 111 of FIG. 10) that includes a light source section (the light source section 161 and the diffusion lens 163 of FIG. 5) that emits light (laser light) extending in a first direction (the vertical direction), and a drive section (the single-axis galvanometer mirror 162 of FIG. 5) that drives an emission orientation of the light such that the light is emitted in a second direction (the horizontal direction) that is orthogonal to the first direction; a light source controller (the laser driver 113 of FIG. 10) that controls a timing at which the light source section emits the light; a light receiver (the laser light receiver 114 of FIG. 10) that has a specified light-receiving range, and receives the light that is emitted by the light source section to be reflected off an object (the object 3 of FIG. 10); a period-of-time measurement section (the TDC 122 of FIG. 10) that measures a period of time from the light source section emitting the light to the light receiver receiving the light reflected off the object; and a distance calculator (the signal processor 115 of FIG. 10) that calculates a distance to the object from the light receiver or the light source module on the basis of the measured period of time.

Further, the image-capturing apparatus (the image-capturing apparatus 20 of FIG. 10) includes a pixel section (the pixel section 221 of, for example, FIGS. 8 and 10) that includes a plurality of two-dimensionally arranged pixels (the pixels 231 of, for example, FIG. 8), and has an image-capturing range (the imager effective region of FIG. 11) that includes at least a portion of an emission range (the LiDAR effective region of FIG. 11) to which the light is emitted by the light source section; an AD converter (the row-parallel AD converter section 222 of, for example, FIGS. 8 and 10) that is arranged in the first direction (the vertical direction), and performs AD conversion on signals output from a group of pixels arranged in the pixel section in the first direction; and an exposure controller (the line driver 213 of FIG. 10) that controls exposure of the plurality of pixels such that the plurality of pixels is scanned in the second direction (the horizontal direction).

Furthermore, the synchronization controller (the timing generator 30A of FIG. 10) controls the light source controller (the laser driver 113 of FIG. 10) and the exposure controller (the line driver 213 of FIG. 10) such that the timing at which the light source section (the light source section 161 of FIG. 5) emits the light to a specified region (a region in the region A of FIG. 14) is synchronized with the timing at which the group of pixels (the pixels 231 arranged in the pixel section 221 of, for example, FIG. 10) corresponding to the specified region (the region in the region A of FIG. 14) is exposed.

The sensor fusion system of the present disclosure (the sensor fusion system 1 of FIG. 10) having the configuration described above makes it possible to synchronize the ranging apparatus (the ranging apparatus 10 of FIG. 10) and the image-capturing apparatus (the image-capturing apparatus 20 of FIG. 10) to improve a performance in fusion recognition.

2. Modifications

The example in which, in order to synchronize the ranging apparatus 10 and the image-capturing apparatus 20, horizontal back-and-forth scanning of a one-dimensional scanning scheme of a beam scanning scheme is adopted as the scanning scheme of the ranging apparatus 10 and a row-parallel ADC scheme is adopted as the ADC scheme of the image-capturing apparatus 20 such that exposure is performed by the rolling shutter scheme, has been described above. However, a combination of these schemes is an example. In other words, schemes other than those of the combination described above may be adopted since there exists a large number of combinations of the scanning scheme and the ADC scheme. Note that, although the description has been made on the assumption that the ranging apparatus 10 is a time-of-flight (ToF) LiDAR, a distance-image sensor of another type may be used.

Further, the example in which an excessive pixel is used in the scheme using space division has been described above. However, there exist various ways of using the excessive pixel. The following is another example of using an excessive pixel.

For example, there is a case (hereinafter referred to as a case A) in which, when the depth resolution (depth information) necessary to perform object recognition processing is not obtained only by the number of groups of points acquired by the ranging apparatus 10, all of the two-dimensional resolution (2D resolution) in the image-capturing apparatus 20 is synchronized with the ranging apparatus 10 to improve the fusion recognition rate.

Figure 26:
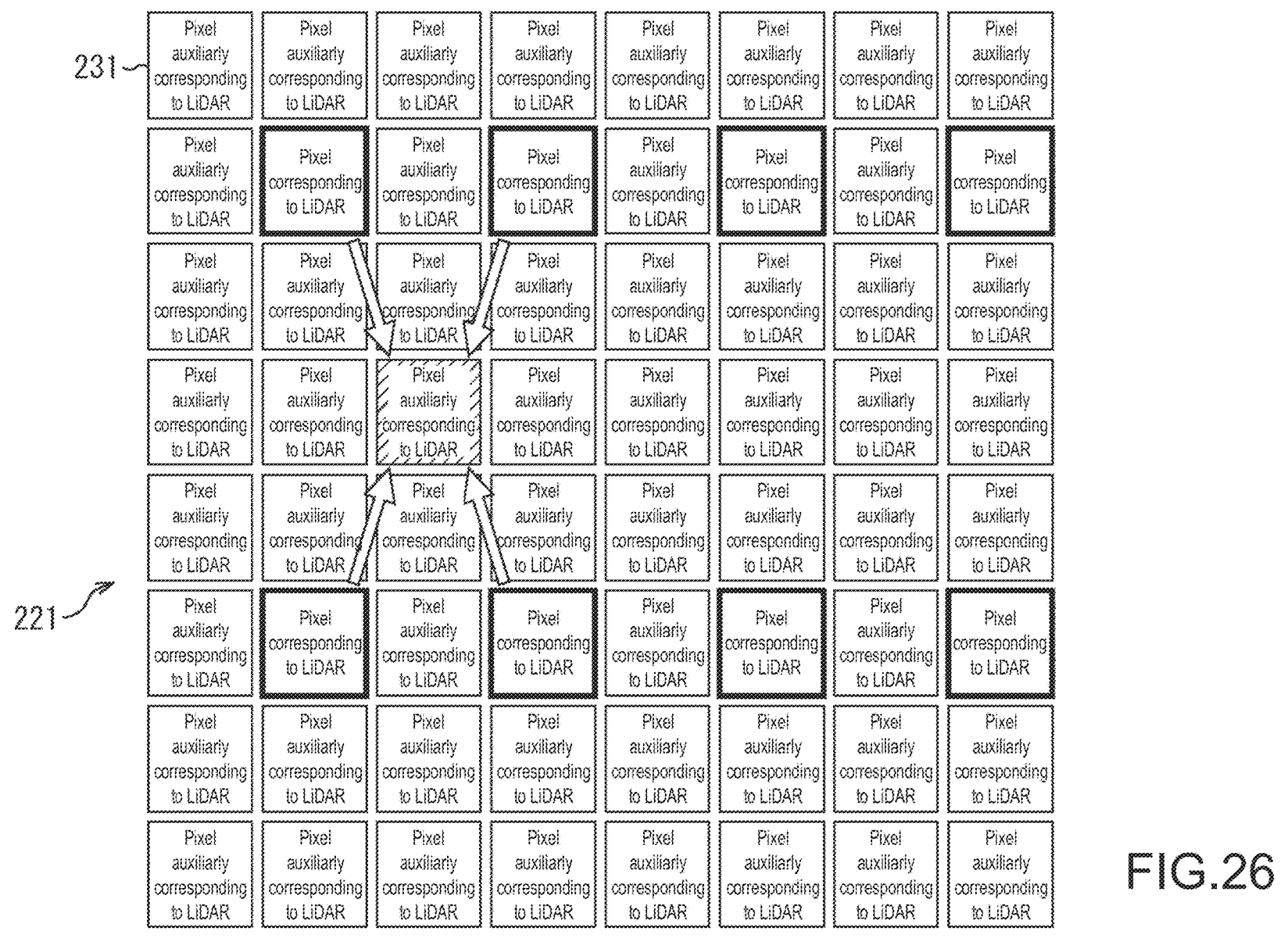

In the case A, as illustrated in FIG. 26, the exposure timing of an excessive pixel (a "pixel auxiliary corresponding to LiDAR"), from among a plurality of pixels 231 arranged in the pixel section 221 of the image sensor 211 of the image-capturing apparatus 20, that does not correspond to the position of a group of points acquired by the ranging apparatus 10 is controlled by performing spatial interpolation using the exposure timing of the pixel 231 (a "pixel corresponding to LiDAR") that corresponds to the position of a close group of points (acquired by the ranging apparatus 10). Specifically, in the example of FIG. 26, spatial interpolation is performed with respect to the exposure timing of a hatched excessive pixel (a "pixel auxiliary corresponding to LiDAR") using the exposure timings of four pixels 231 that are the upper left, upper right, lower left, and lower right pixels 231 ("pixels corresponding to LiDAR"), as indicated by arrows in the figure.

However, compared to the case of the ranging apparatus 10, the exposure timing of the pixel 231 arranged in the pixel section 221 of the image-capturing apparatus 20 can be made coarse. Thus, a signal line used to control the timing can be shared for each pixel region of the same timing.

Further, for example, there is a case (hereinafter referred to as a case B) in which the depth resolution necessary to perform object recognition processing is obtained by the number of groups of points acquired by the ranging apparatus 10, and a portion of the 2D resolution in the image-capturing apparatus 20 is used without being synchronized with the ranging apparatus 10.

In the case B, with respect to some of excessive pixels ("pixels auxiliary corresponding to LiDAR") that each do not correspond to the position of a group of points acquired by the ranging apparatus 10, spatial interpolation is performed with respect to the exposure timing using the exposure timing of the pixel 231 (a "pixel corresponding to LiDAR") that corresponds to the position of a close group of points. With respect to the other excessive pixels ("pixels for a still image"), for example, image-capturing is separately performed by the global shutter scheme such that a still image without focal plane distortion can also be acquired at the same time. This is illustrated in FIG. 27. Specifically, in the example of FIG. 27, excessive pixels in the first, second, fifth, and sixth rows are used as the former "pixels auxiliary corresponding to LiDAR", whereas excessive pixels in the third, fourth, seventh, and eighth rows are used as the latter "pixels for a still image". Note that, in order to apply the case B, there is a need to design a hardware circuit in advance such that the exposure time, the reading timing, and the like for the former "pixel auxiliary corresponding to LiDAR" can be controlled separately from those for the latter "pixel for a still image"

Note that an example other than the above-described cases A and B of using an excessive pixel may be used in combination with the embodiments described above.

Further, in the present disclosure, the system refers to a collection of a plurality of components (such as apparatuses and modules (parts)) and it does not matter whether all of the components are in a single housing. Thus, a plurality of apparatuses accommodated in separate housings and connected to one another via a network, and a single apparatus in which a plurality of modules is accommodated in a single housing are both the system.

3. Example of Application to Mobile Object

The technology according to the present disclosure (the present technology) can be applied to various products. For example, the technology according to the present disclosure may be provided as an apparatus mounted on any kind of mobile object such as vehicle, electric vehicle, hybrid electric vehicle, motorcycle, bicycle, personal mobility, airplane, drone, ship, or robot.

Figure 28:
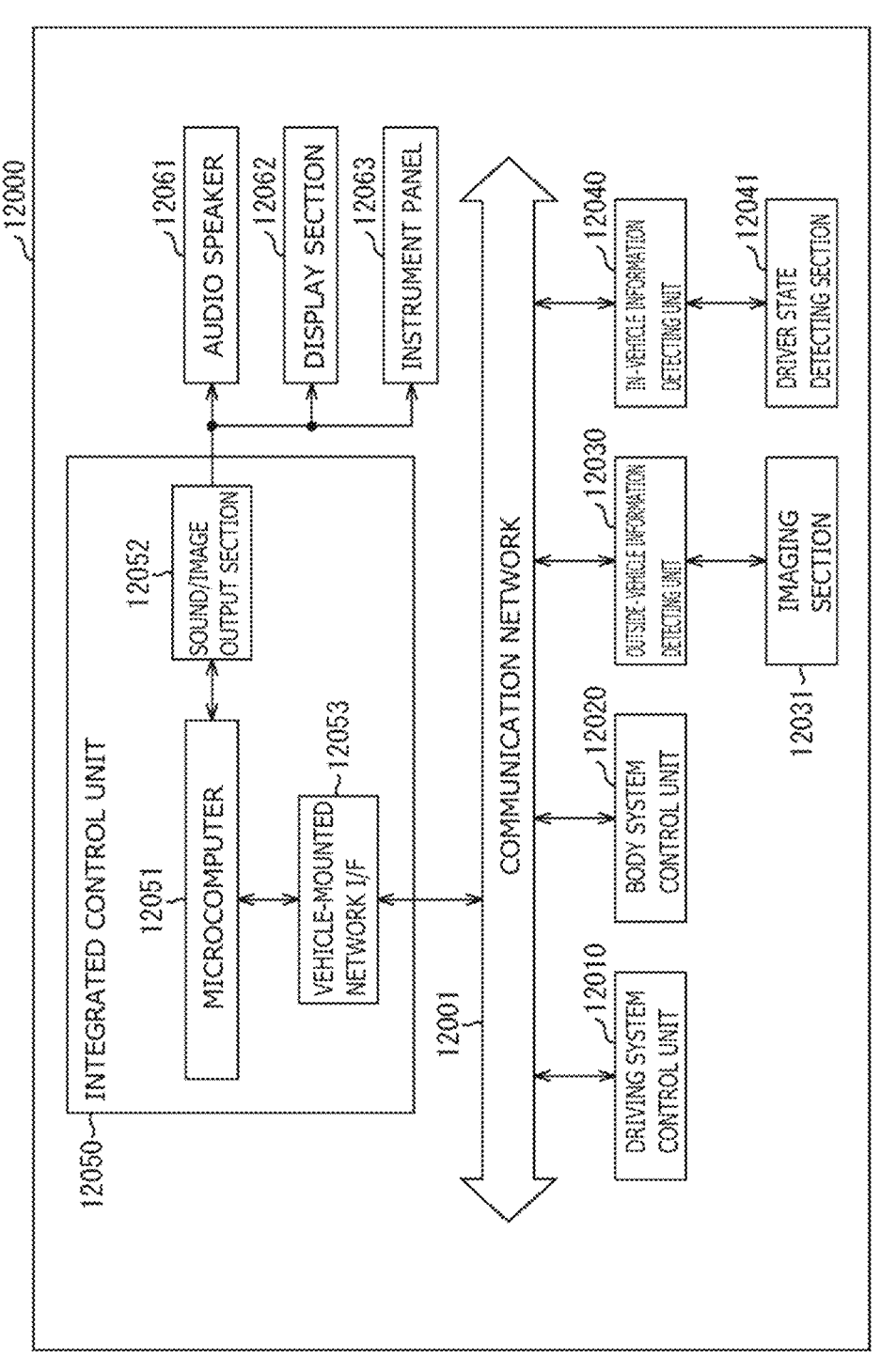
FIG. 28 is a block diagram depicting an example of schematic configuration of a vehicle control system.

FIG. 28 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 28, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 28, an audio speaker 12061, a display section 12062, and an instrument panel 12063 are illustrated as the output device. The display section 12062 may, for example, include at least one of an on-board display and a head-up display.

Figure 29:
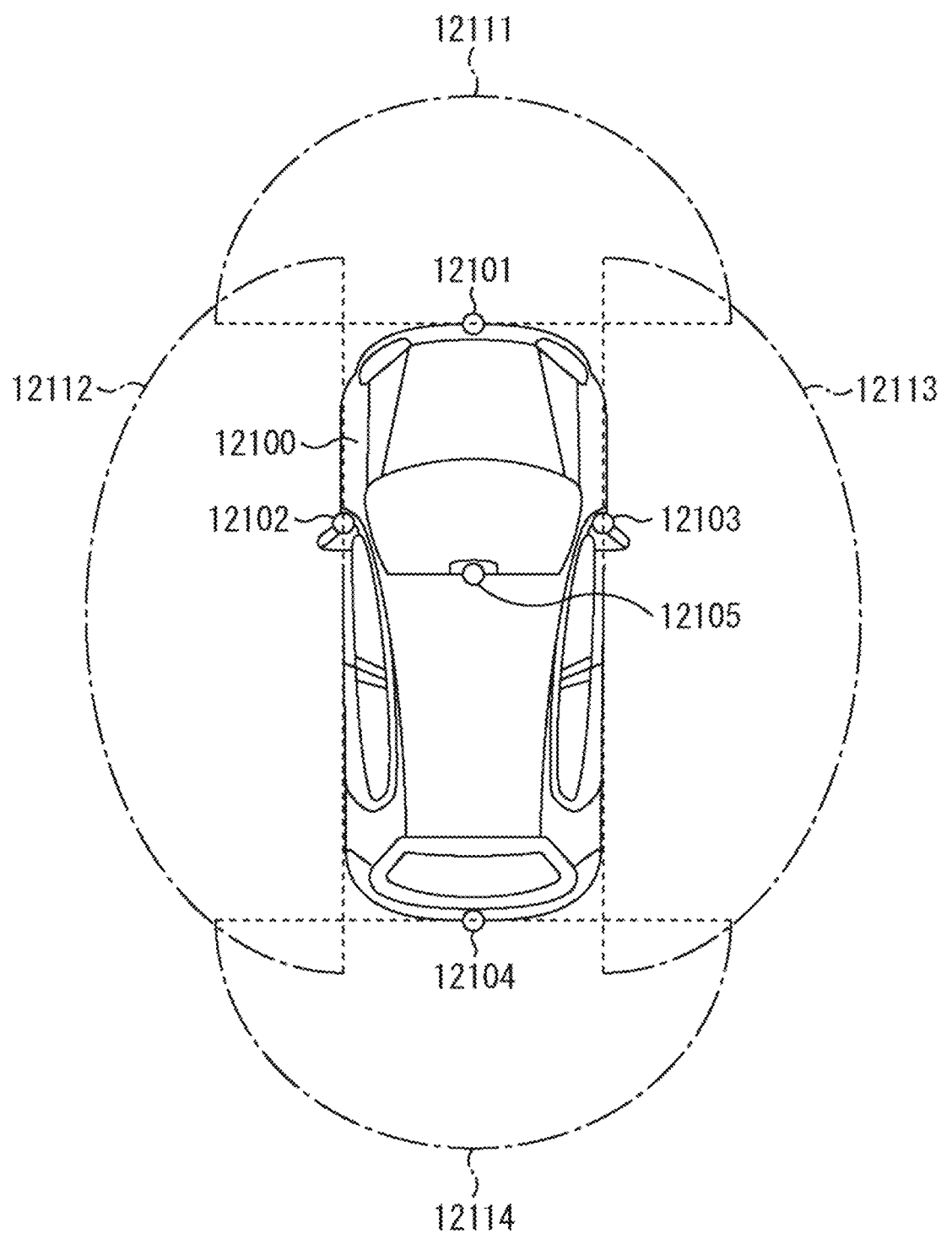
FIG. 29 is a diagram of assistance in explaining an example of installation positions of an outside-vehicle information detecting section and an imaging section.

FIG. 29 is a diagram depicting an example of the installation position of the imaging section 12031.

In FIG. 29, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 29 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of a vehicle control system to which the technology according to the present disclosure can be applied has been described above. The technology according to the present disclosure can be applied to the imaging section 12101 from among the configurations described above. Specifically, the sensor fusion system 1 of FIG. 10 can be applied to the imaging section 12031. The application of the technology according to the present disclosure to the imaging section 12031 makes it possible to synchronize the ranging apparatus 10 and the image-capturing apparatus 20 in the sensor fusion system 1. This makes it possible to, for example, fuse a distance image and a 2D image to perform a three-dimensional object recognition, and this results in being able to improve a performance in recognizing an object (fusion recognition performance). Consequently, it is possible to, for example, more accurately recognize an object such as a vehicle, a pedestrian, an obstacle, a traffic light, a traffic sign, or a lane.

Further, the ranging apparatus 10 such as LiDAR has the following feature. Since the ranging apparatus 10 generally uses near-infrared light, the ranging apparatus 10 can perform ranging at night, and is robust against a rapid change in light environment. However, the resolution of a distance image is lower than that of a 2D image. On the other hand, the image-capturing apparatus 20 including an image sensor has the following feature. Since the image-capturing apparatus 20 primarily captures an image of visible light, the image-capturing apparatus 20 tends to be inferior to the ranging apparatus 10 in robustness. However, the resolution of a 2D image is higher than that of other images. Note that, since the reliability and the efficacy of the ranging apparatus 10 and the image-capturing apparatus 20 vary dynamically in various road environments, there is a need to optimally control the way and the rate of fusion in adapting to the road environment. If the ranging apparatus 10 and the image-capturing apparatus 20 are not synchronized with each other, this may result in being significantly difficult to control the fusion. In the sensor fusion system 1 of FIG. 10, the synchronization of the ranging apparatus 10 and the image-capturing apparatus 20 makes it possible to easily control the fusion, and thus to improve robustness in totality.

Note that, in the embodiments described above, the system refers to a collection of a plurality of components (such as apparatuses and modules (parts)) and it does not matter whether all of the components are in a single housing. Thus, a plurality of apparatuses accommodated in separate housings and connected to one another via a network, and a single apparatus in which a plurality of modules is accommodated in a single housing are both the system.

Note that the embodiment of the present technology is not limited to the examples described above, and various modifications may be made thereto without departing from the scope of the technology according to the present disclosure.

Further, the technology according to the present disclosure may take the following configurations.

(1) A sensor fusion system, including:
a ranging apparatus that includes
a light source module that includes a light source section and a drive section, the light source section emitting light extending in a first direction, the drive section driving an emission orientation of the light such that the light is emitted in a second direction that is orthogonal to the first direction,
a light source controller that controls a timing at which the light source section emits the light,
a light receiver that has a specified light-receiving range, and receives the light that is emitted by the light source section to be reflected off an object,
a period-of-time measurement section that measures a period of time from the light source section emitting the light to the light receiver receiving the light reflected off the object, and
a distance calculator that calculates a distance to the object from the light receiver or the light source module on the basis of the measured period of time;
an image-capturing apparatus that includes
a pixel section that includes a plurality of two-dimensionally arranged pixels, and has an image-capturing range that includes at least a portion of an emission range to which the light is emitted by the light source section,
an AD converter that is arranged in the first direction, and performs AD conversion on signals output from a group of pixels from among the plurality of pixels, the group of pixels being a group of pixels arranged in the pixel section in the first direction, and
an exposure controller that controls exposure of the plurality of pixels such that the plurality of pixels is scanned in the second direction; and
a synchronization controller that controls the light source controller and the exposure controller such that a timing at which the light source section emits the light to a specified region is synchronized with a timing at which the group of pixels corresponding to the specified region is exposed.
(2) The sensor fusion system according to (1), in which
the first direction is a vertical direction, and
the second direction is a horizontal direction.

(3) The sensor fusion system according to (1) or (2), further including
a setting section that sets a first effective region and a second effective region, the first effective region being the emission range to which the light is emitted by the light source section, the second effective region being the image-capturing range of the pixel section.
(4) The sensor fusion system according to (3), in which the setting section
sets a virtual region that includes the first effective region and the second effective region,
sets a position and a size of the first effective region in the virtual region, and
sets a position and a size of the second effective region in the virtual region.
(5) The sensor fusion system according to (4), in which
on the basis of a coordinate system of the virtual region, the setting section sets a space in a group of points in the light receiver, the group of points being a group of points at which the light is received by the light receiver, and
on the basis of the coordinate system of the virtual region, the setting section sets a space between pixels of the plurality of pixels arranged in the pixel section.
(6) The sensor fusion system according to (5), in which the space in the group of points is larger than the space between the pixels of the plurality of pixels.
(7) The sensor fusion system according to any one of (1) to (6), in which
the drive section drives the emission orientation of the light such that the light is emitted in a single direction in a fixed manner, or such that the light is emitted back and forth alternately.
(8) The sensor fusion system according to (7), in which
when the emission orientation of the light is driven such that the light is emitted back and forth alternately, the exposure controller switches between a timing of exposure performed when the driving is performed in a certain direction, and a timing of exposure performed when the driving is performed in a direction opposite to the certain direction.
(9) The sensor fusion system according to (8), in which
one pixel is continuously used when a blanking period of time with respect to the image-capturing range is equal to or greater than a specified period of time due to the emission range and the image-capturing range being different, and when periods of time for which charges are accumulated do not overlap in the one pixel included in the pixel section upon reversing the emission orientation from the certain direction to the opposite direction.
(10) The sensor fusion system according to (9), in which
a time phase is adjusted for the one pixel.
(11) The sensor fusion system according to (7), in which
when the emission orientation of the light is driven such that the light is emitted back and forth alternately, the exposure controller switches between a timing of exposing a first region that corresponds to the driving performed in a certain direction, and a timing of exposing a second region that is different from the first region and corresponds to the driving performed in a direction opposite to the certain direction.
(12) The sensor fusion system according to (11), in which
the first region includes an excessive pixel that is in excess due to the number of pixels of the plurality of pixels arranged in the pixel section being greater than the number of groups of points in the light receiver, the group of points being a group of points at which the light is received by the light receiver, and the second region includes the excessive pixel.

(13) The sensor fusion system according to (11) or (12), in which at least one of the first region or the second region includes the pixel corresponding to the group of points in the light receiver, the group of points being a group of points at which the light is received by the light receiver.

(14) The sensor fusion system according to any one of (1) to (13), in which the light source section includes a single light source that diffusely irradiates light in a one-dimensional direction, or includes a plurality of light sources arranged in parallel in the one-dimensional direction.

(15) The sensor fusion system according to any one of (1) to (14), in which a control line from the exposure controller to the pixel section is arranged in the first direction.

(16) The sensor fusion system according to any one of (1) to (15), in which a scanning scheme of the ranging apparatus is horizontal back-and-forth scanning, and an ADC scheme of the image-capturing apparatus is a row-parallel ADC scheme.

(17) The sensor fusion system according to any one of (1) to (16), in which the exposure controller controls exposure performed by a rolling shutter scheme.

(18) The sensor fusion system according to any one of (1) to (17), in which the ranging apparatus is LiDAR, and the image-capturing apparatus includes an image sensor.

(19) A synchronization control apparatus that controls synchronization of a ranging apparatus and an image-capturing apparatus, the ranging apparatus including a light source module that includes a light source section and a drive section, the light source section emitting light extending in a first direction, the drive section driving an emission orientation of the light such that the light is emitted in a second direction that is orthogonal to the first direction, a light source controller that controls a timing at which the light source section emits the light, a light receiver that has a specified light-receiving range, and receives the light that is emitted by the light source section to be reflected off an object, a period-of-time measurement section that measures a period of time from the light source section emitting the light to the light receiver receiving the light reflected off the object, and a distance calculator that calculates a distance to the object from the light receiver or the light source module on the basis of the measured period of time, the image-capturing apparatus including a pixel section that includes a plurality of two-dimensionally arranged pixels, and has an image-capturing range that includes at least a portion of an emission range to which the light is emitted by the light source section, an AD converter that is arranged in the first direction, and performs AD conversion on signals output from a group of pixels from among the plurality of pixels, the group of pixels being a group of pixels arranged in the pixel section in the first direction, and an exposure controller that controls exposure of the plurality of pixels such that the plurality of pixels is scanned in the second direction, the synchronization control apparatus including a synchronization controller that controls the light source controller and the exposure controller such that a timing at which the light source section emits the light to a specified region is synchronized with a timing at which the group of pixels corresponding to the specified region is exposed.

(20) A synchronization control method, including controlling a light source controller and an exposure controller by a synchronization control apparatus that controls synchronization of a ranging apparatus and an image-capturing apparatus, the ranging apparatus including a light source module that includes a light source section and a drive section, the light source section emitting light extending in a first direction, the drive section driving an emission orientation of the light such that the light is emitted in a second direction that is orthogonal to the first direction, a light source controller that controls a timing at which the light source section emits the light, a light receiver that has a specified light-receiving range, and receives the light that is emitted by the light source section to be reflected off an object, a period-of-time measurement section that measures a period of time from the light source section emitting the light to the light receiver receiving the light reflected off the object, and a distance calculator that calculates a distance to the object from the light receiver or the light source module on the basis of the measured period of time, the image-capturing apparatus including a pixel section that includes a plurality of two-dimensionally arranged pixels, and has an image-capturing range that includes at least a portion of an emission range to which the light is emitted by the light source section, an AD converter that is arranged in the first direction, and performs AD conversion on signals output from a group of pixels from among the plurality of pixels, the group of pixels being a group of pixels arranged in the pixel section in the first direction, and an exposure controller that controls exposure of the plurality of pixels such that the plurality of pixels is scanned in the second direction, the controlling the light source controller and the exposure controller is performed such that a timing at which the light source section emits the light to a specified region is synchronized with a timing at which the group of pixels corresponding to the specified region is exposed.

REFERENCE SIGNS LIST

1 sensor fusion system
2 object recognizing apparatus
3 object
10 ranging apparatus
20 image-capturing apparatus 30 synchronization control apparatus
30A timing generator
30B setting register section
40 image fusing apparatus
111 laser source section
112 register
113 laser driver
114 laser light receiver
115 signal processor
121 SPAD section
122 TDC
123 frame memory
161 light source section
162 single-axis galvanometer mirror
163 diffusion lens
211 image sensor
212 register
213 line driver
214 signal processor
221 pixel section
231 pixel
222 ADC section
222B row-parallel ADC section
223 frame memory
12031 imaging section

The invention claimed is:

1. A sensor fusion system, comprising:
a ranging apparatus that includes
a light source module that includes a light source section and a drive section, the light source section emitting light extending in a first direction, the drive section driving an emission orientation of the light such that the light is emitted in a second direction that is orthogonal to the first direction,
a light source controller that controls a timing at which the light source section emits the light,
a light receiver that has a specified light-receiving range, and receives the light that is emitted by the light source section to be reflected off an object,
a period-of-time measurement section that measures a period of time from the light source section emitting the light to the light receiver receiving the light reflected off the object, and
a distance calculator that calculates a distance to the object from the light receiver or the light source module on a basis of the measured period of time;
an image-capturing apparatus that includes
a pixel section that includes a plurality of two-dimensionally arranged pixels, and has an image-capturing range that includes at least a portion of an emission range to which the light is emitted by the light source section,
an AD converter configured to perform AD conversion in parallel, and performs AD conversion on signals output from a group of pixels from among the plurality of pixels, the group of pixels being a group of pixels arranged in the pixel section in the first direction, and
an exposure controller that controls exposure of the plurality of pixels such that the plurality of pixels is scanned in the second direction; and
a synchronization controller that controls the light source controller and the exposure controller such that a timing at which the light source section emits the light to a specified region is synchronized with a timing at which the group of pixels corresponding to the specified region is exposed
further comprising a setting section that sets a first effective region and a second effective region, the first tive region and a second effective region, the first effective region being the emission range to which the light is emitted by the light source section, the second effective region being the image-capturing range of the pixel section
wherein the setting section sets a virtual region that includes the first effective region and the second effective region, sets a position and a size of the first effective region in the virtual region, and sets a position and a size of the second effective region in the virtual region.

2. The sensor fusion system according to claim 1, wherein the first direction is a vertical direction, and the second direction is a horizontal direction.

3. The sensor fusion system according to claim 1, wherein on a basis of a coordinate system of the virtual region, the setting section sets a space in a group of points in the light receiver, the group of points being a group of points at which the light is received by the light receiver, and on the basis of the coordinate system of the virtual region, the setting section sets a space between pixels of the plurality of pixels arranged in the pixel section.

4. The sensor fusion system according to claim 3, wherein the space in the group of points is larger than the space between the pixels of the plurality of pixels.

5. The sensor fusion system according to claim 1, wherein the drive section drives the emission orientation of the light such that the light is emitted in a single direction in a fixed manner, or such that the light is emitted back and forth alternately.

6. The sensor fusion system according to claim 5, wherein when the emission orientation of the light is driven such that the light is emitted back and forth alternately, the exposure controller switches between a timing of exposure performed when the driving is performed in a certain direction, and a timing of exposure performed when the driving is performed in a direction opposite to the certain direction.

7. The sensor fusion system according to claim 6, wherein one pixel is continuously used when a blanking period of time with respect to the image-capturing range is equal to or greater than a specified period of time due to the emission range and the image-capturing range being different, and when periods of time for which charges are accumulated do not overlap in the one pixel included in the pixel section upon reversing the emission orientation from the certain direction to the opposite direction.

8. The sensor fusion system according to claim 7, wherein a time phase is adjusted for the one pixel.

9. The sensor fusion system according to claim 5, wherein when the emission orientation of the light is driven such that the light is emitted back and forth alternately, the exposure controller switches between a timing of exposing a first region that corresponds to the driving performed in a certain direction, and a timing of exposing a second region that is different from the first region and corresponds to the driving performed in a direction opposite to the certain direction.

10. The sensor fusion system according to claim 9, wherein the first region includes an excessive pixel that is in excess due to the number of pixels of the plurality of pixels arranged in the pixel section being greater than the number of groups of points in the light receiver, the group of points being a group of points at which the light is received by the light receiver, and the second region includes the excessive pixel.

11. The sensor fusion system according to claim 10, wherein at least one of the first region or the second region includes the pixel corresponding to the group of points in the light receiver, the group of points being a group of points at which the light is received by the light receiver.

12. The sensor fusion system according to claim 1, wherein the light source section includes a single light source that diffusely irradiates light in a one-dimensional direction, or includes a plurality of light sources arranged in parallel in the one-dimensional direction.

13. The sensor fusion system according to claim 1, wherein a control line from the exposure controller to the pixel section is arranged in the first direction.

14. The sensor fusion system according to claim 1, wherein a scanning scheme of the ranging apparatus is horizontal back-and-forth scanning, and an ADC scheme of the image-capturing apparatus is a row-parallel ADC scheme.

15. The sensor fusion system according to claim 14, wherein the exposure controller controls exposure performed by a rolling shutter scheme.

16. The sensor fusion system according to claim 1, wherein the ranging apparatus is LiDAR, and the image-capturing apparatus includes an image sensor.

17. A synchronization control apparatus that controls synchronization of a ranging apparatus and an image-capturing apparatus, the ranging apparatus including a light source module that includes a light source section and a drive section, the light source section emitting light extending in a first direction, the drive section driving an emission orientation of the light such that the light is emitted in a second direction that is orthogonal to the first direction, a light source controller that controls a timing at which the light source section emits the light, a light receiver that has a specified light-receiving range, and receives the light that is emitted by the light source section to be reflected off an object, a period-of-time measurement section that measures a period of time from the light source section emitting the light to the light receiver receiving the light reflected off the object, and a distance calculator that calculates a distance to the object from the light receiver or the light source module on a basis of the measured period of time, the image-capturing apparatus including a pixel section that includes a plurality of two-dimensionally arranged pixels, and has an image-capturing range that includes at least a portion of an emission range to which the light is emitted by the light source section, an AD converter configured to perform AD conversion in parallel, and performs AD conversion on signals output from a group of pixels from among the plurality of pixels, the group of pixels being a group of pixels arranged in the pixel section in the first direction, and an exposure controller that controls exposure of the plurality of pixels such that the plurality of pixels is scanned in the second direction, the synchronization control apparatus comprising a synchronization controller that controls the light source controller and the exposure controller such that a timing at which the light source section emits the light to a specified region is synchronized with a timing at which the group of pixels corresponding to the specified region is exposed further comprising a setting section that sets a first effective region and a second effective region, the first effective region being the emission range to which the light is emitted by the light source section, the second effective region being the image-capturing range of the pixel section wherein the setting section sets a virtual region that includes the first effective region and the second effective region, sets a position and a size of the first effective region in the virtual region, and sets a position and a size of the second effective region in the virtual region.

18. A synchronization control method, comprising controlling a light source controller and an exposure controller by a synchronization control apparatus that controls synchronization of a ranging apparatus and an image-capturing apparatus, the ranging apparatus including a light source module that includes a light source section and a drive section, the light source section emitting light extending in a first direction, the drive section driving an emission orientation of the light such that the light is emitted in a second direction that is orthogonal to the first direction, a light source controller that controls a timing at which the light source section emits the light, a light receiver that has a specified light-receiving range, and receives the light that is emitted by the light source section to be reflected off an object, a period-of-time measurement section that measures a period of time from the light source section emitting the light to the light receiver receiving the light reflected off the object, and a distance calculator that calculates a distance to the object from the light receiver or the light source module on a basis of the measured period of time, the image-capturing apparatus including a pixel section that includes a plurality of two-dimensionally arranged pixels, and has an image-capturing range that includes at least a portion of an emission range to which the light is emitted by the light source section, an AD converter configured to perform AD conversion in parallel, and performs AD conversion on signals output from a group of pixels from among the plurality of pixels, the group of pixels being a group of pixels arranged in the pixel section in the first direction, and an exposure controller that controls exposure of the plurality of pixels such that the plurality of pixels is scanned in the second direction, the controlling the light source controller and the exposure controller is performed such that a timing at which the light source section emits the light to a specified region is synchronized with a timing at which the group of pixels corresponding to the specified region is exposed further comprising a setting section that sets a first effective region and a second effective region, the first effective region being the emission range to which the light is emitted by the light source section, the second effective region being the image-capturing range of the pixel section wherein the setting section sets a virtual region that includes the first effective region and the second effective region, sets a position and a size of the first effective region in the virtual region, and sets a position and a size of the second effective region in the virtual region.

* * * * *